US011150345B2

(12) United States Patent
 Sakai et al.

(10) Patent No.: US 11,150,345 B2
(45) Date of Patent: Oct. 19, 2021

(54) OBJECT DETECTOR, SENSING DEVICE, AND MOBILE OBJECT APPARATUS

(71) Applicant: Ricoh Company, Ltd., Tokyo (JP)

(72) Inventors: Kohji Sakai, Tokyo (JP); Toshishige Fujii, Kanagawa (JP); Tadashi Nakamura, Kanagawa (JP); Takeshi Ueda, Tokyo (JP); Kohei Ushio, Kanagawa (JP); Yuuta Yoshino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 603 days.

(21) Appl. No.: 16/053,004

(22) Filed: Aug. 2, 2018

(65) Prior Publication Data

US 2019/0056496 A1 Feb. 21, 2019

(30) Foreign Application Priority Data

Aug. 18, 2017 (JP) .............................. JP2017-157859

(51) Int. Cl.
 *G01S 17/04* (2020.01)
 *G01S 7/487* (2006.01)
 (Continued)

(52) U.S. Cl.
 CPC .............. *G01S 17/04* (2020.01); *G01S 7/484* (2013.01); *G01S 7/487* (2013.01); *G01S 17/42* (2013.01);
 (Continued)

(58) Field of Classification Search
 CPC .......... G01S 17/04; G01S 7/487; G01S 7/484; G01S 17/42; G01S 17/931; G01S 17/10;
 (Continued)

(56) References Cited

U.S. PATENT DOCUMENTS 5,488,377 A * 1/1996 Reynolds, III ........ G01S 7/2927
 342/91
2009/0262760 A1* 10/2009 Krupkin .................. G01S 7/484
 372/6
(Continued)

FOREIGN PATENT DOCUMENTS

JP 63-101880 7/1988
JP H07-035858 A 2/1995
(Continued)

OTHER PUBLICATIONS

Office Action dated Apr. 6, 2021 in Japanese Patent Application No. 2017-157859, 3 pages.

*Primary Examiner* — Luke D Ratcliffe
(74) *Attorney, Agent, or Firm* — Xsensus LLP

(57) ABSTRACT

First and second types of object detectors, a sensing device, and a mobile apparatus. The first and second types of object detectors include a light source configured to emit light, photoreceptor configured to receive the light reflected by an object, and a binarizing circuit configured to binarize a signal sent from the photoreceptor at a threshold $V_{th}$. In the first and second types of object detectors, object detection processes are performed in a same direction until a high-level signal is output M times from the signal binarized by the binarizing circuit. In the first type of object detector, a value of the M is determined based on an incidence of shot noise where peak intensity exceeds the threshold $V_{th}$ in the photoreceptor. In the second type of object detector, a threshold $V_{th}$ is set based on a value of the M.

18 Claims, 12 Drawing Sheets

(51) Int. Cl.
*G02B 27/00* (2006.01)
*G01S 17/10* (2020.01)
*G01C 3/08* (2006.01)
*G01S 17/931* (2020.01)
*G01S 7/484* (2006.01)
*G01S 17/42* (2006.01)
*G01S 7/486* (2020.01)

(52) U.S. Cl.
CPC .............. *G01C 3/08* (2013.01); *G01S 7/4868* (2013.01); *G01S 17/10* (2013.01); *G01S 17/931* (2020.01); *G02B 27/0031* (2013.01)

(58) Field of Classification Search
CPC . G01S 7/4868; G02B 27/0031; G02B 26/105; G02B 27/003; G02B 26/1051; G01C 3/08
See application file for complete search history.

(56) References Cited

U.S. PATENT DOCUMENTS

| | | |
|---|---|---|
| 2014/0009747 A1 | 1/2014 | Suzuki et al. |
| 2014/0034817 A1 | 2/2014 | Nakamura et al. |
| 2014/0036071 A1 | 2/2014 | Nakamura et al. |
| 2014/0209793 A1 | 7/2014 | Nakamura et al. |
| 2015/0124238 A1 | 5/2015 | Sakai et al. |
| 2015/0160341 A1 | 6/2015 | Akatsu et al. |
| 2015/0204977 A1 | 7/2015 | Sakai |
| 2015/0268332 A1 | 9/2015 | Nakamura |
| 2015/0268343 A1 | 9/2015 | Uehira et al. |
| 2015/0331108 A1 | 11/2015 | Itami et al. |
| 2016/0061955 A1 | 3/2016 | Imai et al. |
| 2016/0096474 A1 | 4/2016 | Sakai |
| 2016/0097843 A1 | 4/2016 | Nakamura |
| 2016/0261090 A1 | 9/2016 | Sakai et al. |
| 2016/0274223 A1 | 9/2016 | Imai |
| 2016/0370460 A1 | 12/2016 | Takahashi et al. |
| 2017/0082747 A1 | 3/2017 | Akatsu et al. |
| 2017/0123063 A1 | 5/2017 | Yamashita et al. |
| 2017/0168261 A1 | 6/2017 | Itami et al. |
| 2017/0273161 A1 | 9/2017 | Nakamura |
| 2017/0356796 A1* | 12/2017 | Nishio ...................... G01J 1/44 |
| 2017/0356985 A1 | 12/2017 | Yoshino |
| 2018/0038959 A1 | 2/2018 | Akatsu et al. |
| 2018/0128919 A1 | 5/2018 | Ichikawa et al. |
| 2018/0136330 A1 | 5/2018 | Nihei et al. |
| 2018/0372873 A1* | 12/2018 | Koifman ................. G01S 7/484 |

FOREIGN PATENT DOCUMENTS

| | | |
|---|---|---|
| JP | 8-304535 | 11/1996 |
| JP | 10-153417 | 6/1998 |
| JP | 11-038137 | 2/1999 |
| JP | 11-326515 | 11/1999 |
| JP | 2004-184333 | 7/2004 |
| JP | 2014-020889 | 2/2014 |
| JP | 2014-032149 | 2/2014 |
| JP | 2014-232265 | 12/2014 |
| JP | 2014-235075 | 12/2014 |
| JP | 2015-068748 | 4/2015 |
| JP | 2016-008875 | 1/2016 |
| JP | 2016-014577 | 1/2016 |
| JP | 2016-057141 | 4/2016 |
| JP | 2016-127214 | 7/2016 |
| JP | 2016-176721 | 10/2016 |
| JP | 2017-003785 | 1/2017 |
| JP | 2017-003938 | 1/2017 |
| JP | 2017-015611 | 1/2017 |
| JP | 2017-090144 | 5/2017 |
| JP | 2017-224879 | 12/2017 |
| JP | 2018-004256 | 1/2018 |
| JP | 2018-004257 | 1/2018 |
| JP | 2018-004372 | 1/2018 |
| JP | 2018-004374 | 1/2018 |
| JP | 2018-005183 | 1/2018 |
| JP | 2018-077071 | 5/2018 |
| WO | 2016/208318 A1 | 12/2016 |

* cited by examiner

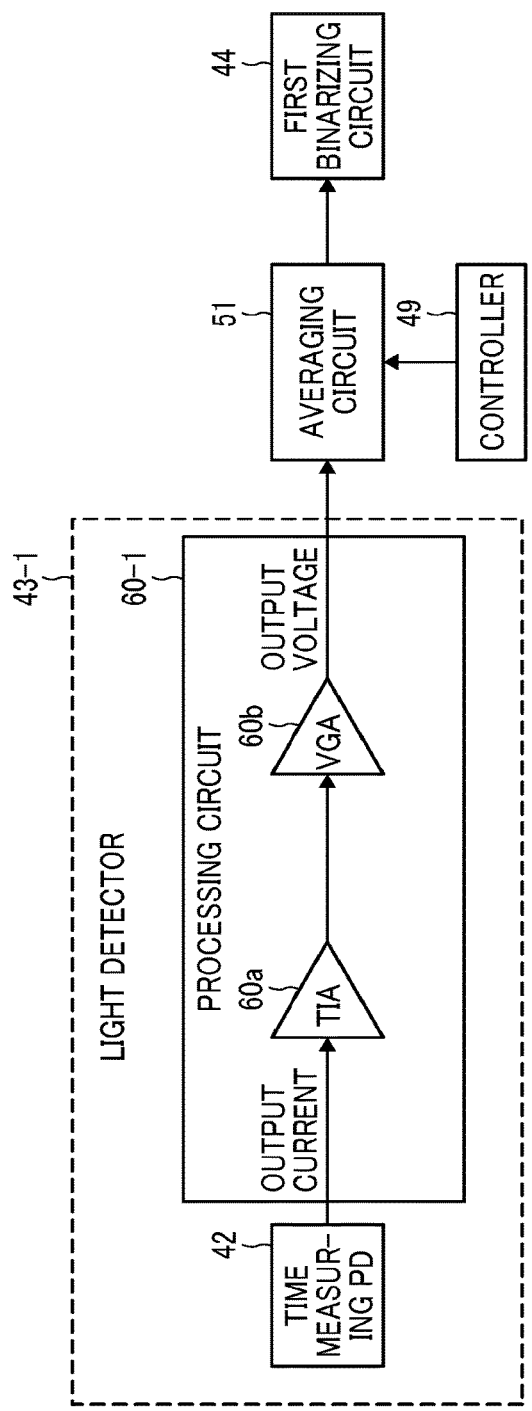
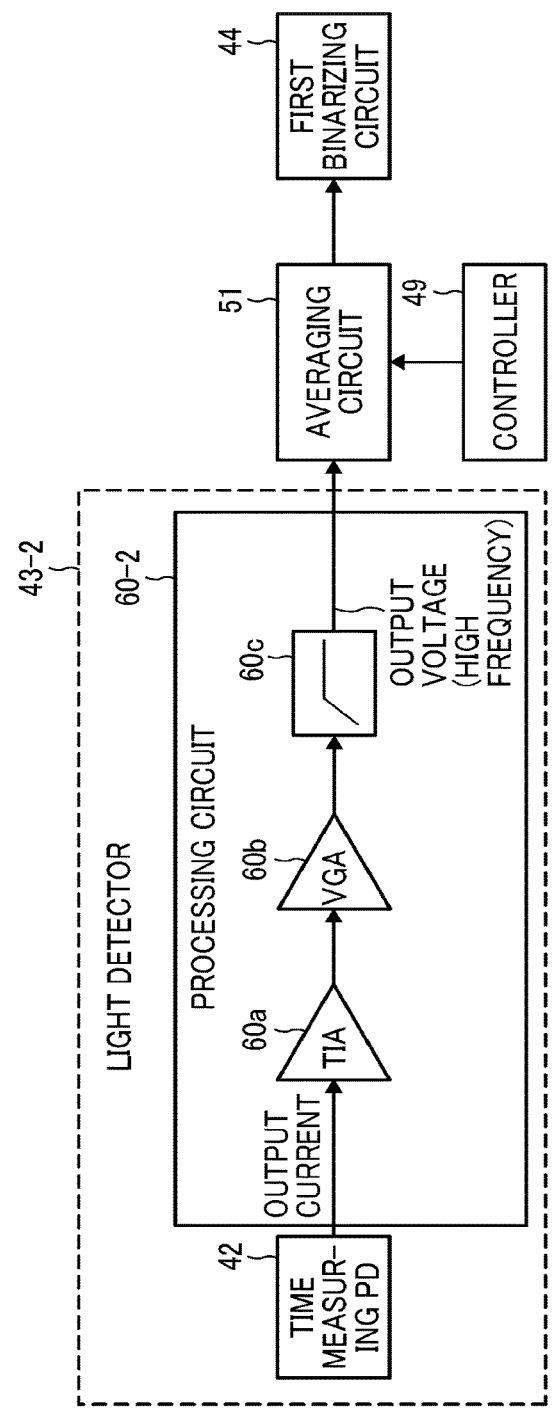
FIG. 13A
FIG. 13B

OBJECT DETECTOR, SENSING DEVICE, AND MOBILE OBJECT APPARATUS

CROSS-REFERENCE TO RELATED APPLICATION

This patent application is based on and claims priority pursuant to 35 U.S.C. § 119(a) to Japanese Patent Application No. 2017-157859, filed on Aug. 18, 2017, in the Japan Patent Office, the entire disclosure of which is hereby incorporated by reference herein.

BACKGROUND

Technical Field

Embodiment of the present disclosure relate to an object detector, a sensing device, and a mobile apparatus.

Background Art

Conventionally, technologies are known in the art to obtain the information about an object (for example, the presence or absence of the object, the distance to the object, the shape of the object). In such technologies, light is emitted and the light reflected by an object is received, and the received light is converted into an electrical signal and the obtained electrical signal is binarized.

SUMMARY

Embodiments of the present disclosure described herein provide first and second types of object detectors, a sensing device, and a mobile apparatus. The first and second types of object detectors include a light source configured to emit light, photoreceptor configured to receive the light reflected by an object, and a binarizing circuit configured to binarize a signal sent from the photoreceptor at a threshold $V_{th}$. In the first and second types of object detectors, object detection processes are performed in a same direction until a high-level signal is output M times from the signal binarized by the binarizing circuit. In the first type of object detector, a value of the M is determined based on an incidence of shot noise where peak intensity exceeds the threshold $V_{th}$ in the photoreceptor. In the second type of object detector, a threshold $V_{th}$ is set based on a value of the M. The sensing device includes the object detector, and a monitoring controller configured to obtain movement information of an object including at least one of presence or absence of movement of the object, a moving direction, and speed of the object, based on output from the object detector. The mobile object apparatus includes the sensing device, and a mobile object provided with the sensing device.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 13A is a diagram illustrating the first configuration of a detection system used for the second distance measuring processes, according to an embodiment of the present disclosure.

FIG. 13B is a diagram illustrating the second configuration of a detection system used for the second distance measuring processes, according to an embodiment of the present disclosure.

Figure 1:
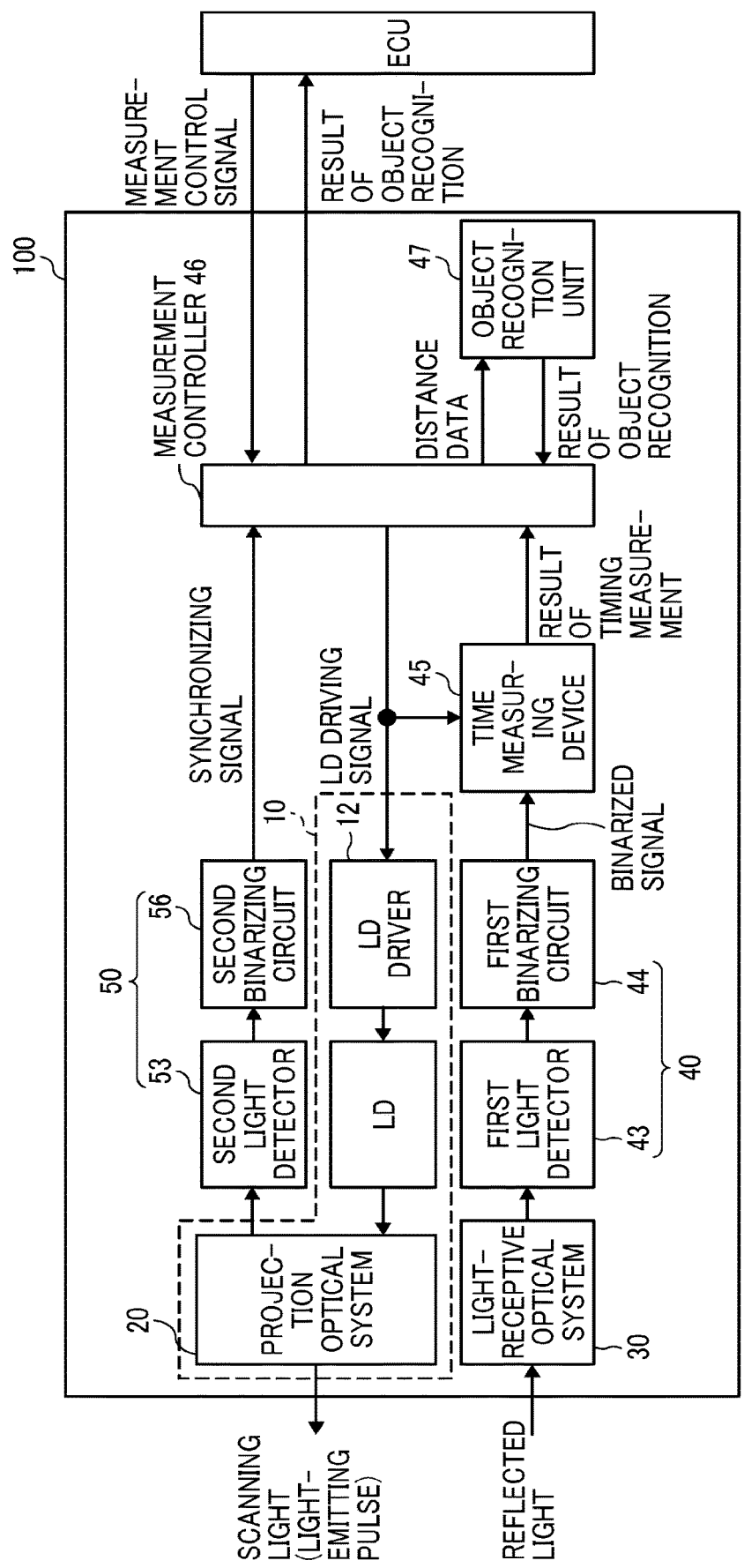
FIG. 1 is a schematic block diagram of a configuration of an object detector according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An object detector 100 according to an embodiment of the present disclosure is described below with reference to the drawings.

FIG. 1 is a schematic block diagram of a configuration of the object detector 100, according to the present embodiment.

The object detector 100 is a light detection and ranging (LiDAR) device that detects the presence of an object such as a preceding vehicle, a parked vehicle, a construction, and a pedestrian, or object data such as the distance to the object. The LiDAR device also indicates a laser imaging detection and ranging device. For example, the object detector 100 is mounted on a vehicle (e.g., a car) that serves as a mobile object, and is supplied with power, for example, by a battery of the car. In the following description, a scanning LiDAR device is used as the object detector 100. However, in some embodiments, a non-scanning LiDAR device may be employed.

The object detector 100 is provided with, for example, a light-emitting system 10, a light receiving optical system 30, a detection system 40, a synchronous system 50, a time measuring device 45, a measurement controller 46, and an object recognition unit 47.

The light-emitting system 10 includes a laser diode (LD) that serves as a light emitting element, a laser diode (LD) driver 12, and a projection optical system 20.

The laser diode is also called an end-surface emitting laser, and is driven by the laser diode driver (drive circuit) 12 to emit a laser beam. The LD driver 12 controls the laser diode to be turned on and emit a laser beam, using a LD drive signal, which is a rectangular pulse signal output from the measurement controller 46. The LD driver 12 includes, for example, a capacitor connected to the laser diode to supply electric current to the laser diode, a transistor that activates or deactivates the conduction between the capacitor and the laser diode, and a charger that charges the capacitor. The measurement controller 46 starts or stops the measurement in response to a measurement control signal, such as a measurement start signal and a measurement stop signal, from an electronic control unit (ECU) on vehicle.

Figure 2A:
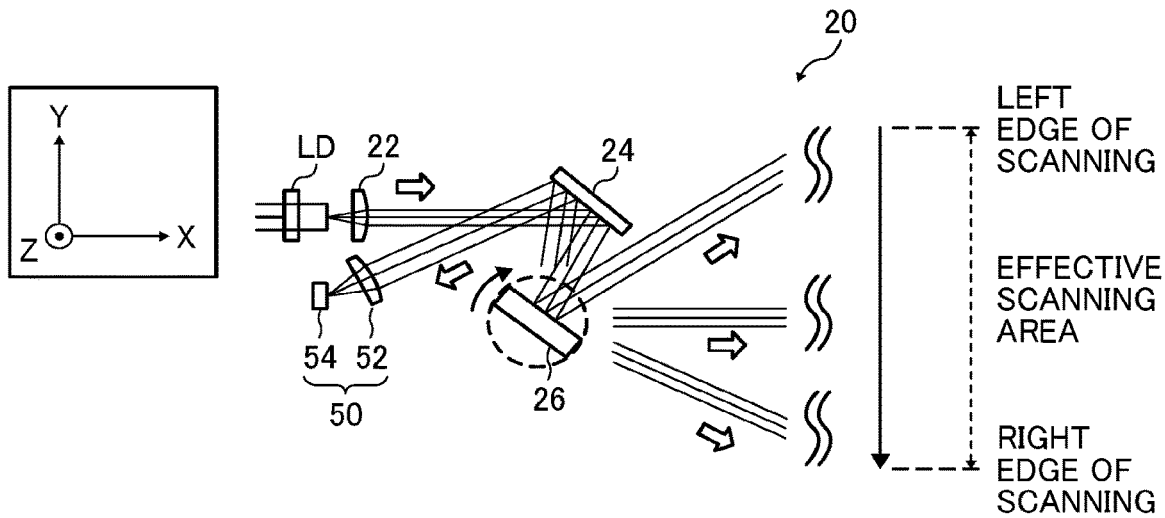
FIG. 2A is a diagram illustrating a projection optical system and a synchronous system, according to an embodiment of the present disclosure.

FIG. 2A schematically illustrates the projection optical system 20 and the synchronous system 50 according to the present embodiment.

Figure 2B:
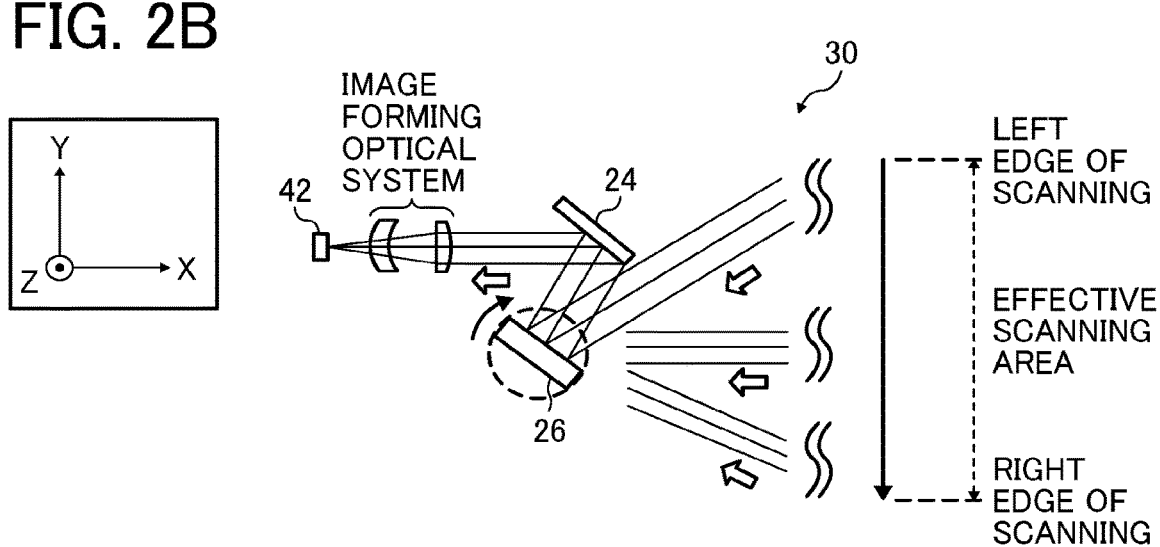
FIG. 2B is diagram illustrating a light-receptive optical system according to an embodiment of the present disclosure.

FIG. 2B schematically illustrates the light receiving optical system 30.

In the following description of FIG. 2A, FIG. 2B, and FIG. 2C, an XYZ three-dimensional rectangular coordinate system is referred to where appropriate. In the XYZ three-dimensional rectangular coordinate system, the Z-axis direction corresponds to the vertical direction.

As illustrated in FIG. 2A, the projection optical system 20 includes a coupling lens 22, a reflecting mirror 24, and a rotating mirror 26 that serves as a light deflector. The coupling lens 22 is disposed in the optical path of the light emitted from the laser diode. The reflecting mirror 24 is disposed in the optical path of the light having passed through the coupling lens 22. The rotating mirror 26 is disposed in the optical path of the light reflected from the reflecting mirror 24. In the present embodiment, the reflecting mirror 24 is disposed in the optical path between the coupling lens 22 and the rotating mirror 26, such that the optical path is folded to reduce the size of the object detector 100.

In the optical path, the light emitted from the laser diode passes through the coupling lens 22 to be shaped into a predetermined beam profile, and the shaped light is then reflected by the reflecting mirror 24. The rotating mirror 26 deflects the reflected light around the Z-axis within a predetermined range of deflection.

The light deflected by the rotating mirror 26 within the predetermined range of deflection around the Z-axis corresponds to the light projected by the projection optical system 20, that is, the light projected from the object detector 100.

The rotating mirror 26 includes a plurality of reflection planes around the axis of rotation (Z-axis) to reflect (deflect) the light reflected from the reflecting mirror 24 while rotating around the axis of rotation, thereby causing the light to one-dimensionally scan an effective scan area corresponding to the above range of deflection in a horizontal one-axis direction (Y-axis direction). In this case, the range of deflection, i.e., the effective scan area, lies on the +X side of the object detector 100. In the following description, the direction of rotation of the rotating mirror 26 may be referred to simply as a "rotation direction of mirror." In the present disclosure, the effective scan area may be referred to as a projection range or a detection range.

As understood from FIG. 2A, the rotating mirror 26 includes two reflection planes opposed to each other. However, no limitation is intended thereby, and in some embodiments, the rotating mirror 26 may include one reflection plane or three or more reflection planes. Alternatively, in some embodiments, the rotating mirror 26 includes at least two reflection planes, which are tilted at different angles with respect to the axis of rotation of the rotating mirror, to switch an area to be scanned and detected in the Z-axis direction.

As illustrated in FIG. 2B, the light receiving optical system 30 includes the rotating mirror 26, the reflecting mirror 24, and an image-forming optical system provided with at least one lens. The rotating mirror 26 reflects the light projected from the projection optical system 20 and reflected (scattered) by an object within an effective scan area. The reflecting mirror 24 reflects the light reflected from the rotating mirror 26. The image-forming optical system is disposed in the optical path of the light reflected by the reflecting mirror 24, and forms an image of the light reflected from the reflecting mirror 24 onto a time measuring photodiode (PD) 42.

Figure 2C:
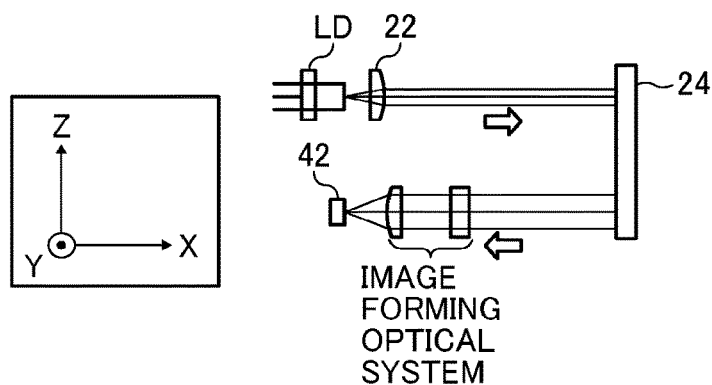
FIG. 2C is a schematic diagram illustrating an optical path between a laser diode and a reflecting mirror and another optical path between the reflecting mirror and a time measuring photodiode, according to an embodiment of the present disclosure.

FIG. 2C is a diagram illustrating an optical path between the laser diode and the reflecting mirror 24 and another optical path between the reflecting mirror 24 and the time measuring photodiode 42.

As understood from FIG. 2C, the projection optical system 20 and the light receiving optical system 30 overlap in the Z-axis direction. The rotating mirror 26 and the reflecting mirror 24 are used in common between the projection optical system 20 and the light receiving optical system 30. Due to this configuration, the relative misalignment can be reduced between the irradiation field of the laser diode and the light-receptive field of the time measuring photodiode 42 on an object, and thus stable detection of the object can be achieved.

The light projected from the projection optical system 20 and reflected (scattered) by an object is guided to the image forming optical system by the rotating mirror 26 and the reflecting mirror 24, and then is concentrated onto the time measuring photodiode 42 (see FIG. 2B). In FIG. 2B, the reflecting mirror 24 is disposed between the rotating mirror 26 and the image forming optical system, folding the optical path to reduce the size of the object detector 100. In the present embodiment, the image forming optical system includes two lenses (imaging lenses). However, in some embodiments, the image forming optical system may include a single lens or three or more lenses. Alternatively, in some other embodiments, a mirror optical system may be employed for the image forming optical system.

As illustrated in FIG. 1, the detection system 40 includes a first light detector 43 and a first binarizing circuit 44 (comparator).

Figure 3A:
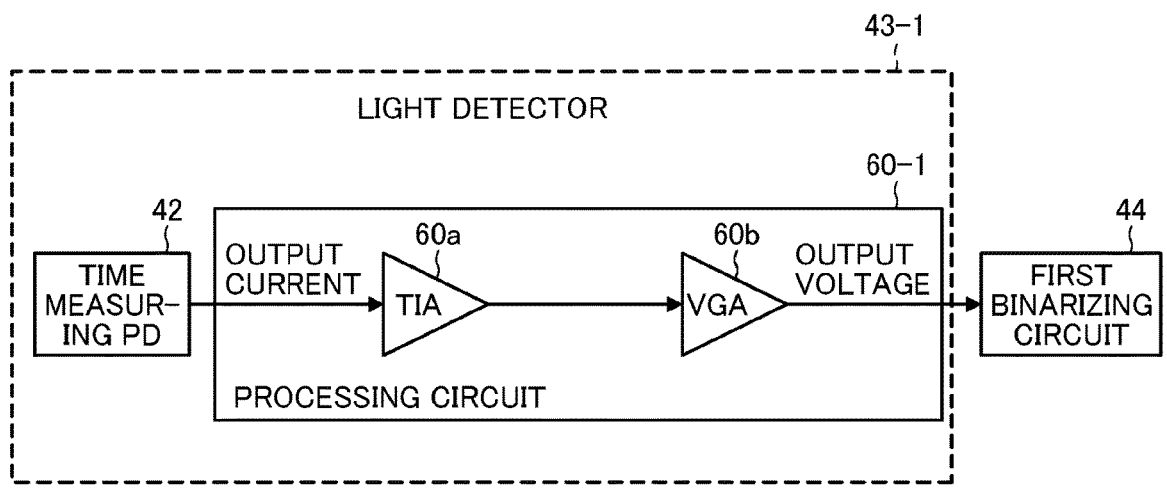
FIG. 3A is a diagram illustrating a first configuration of a light detector, according to an embodiment of the present disclosure.
Figure 3B:
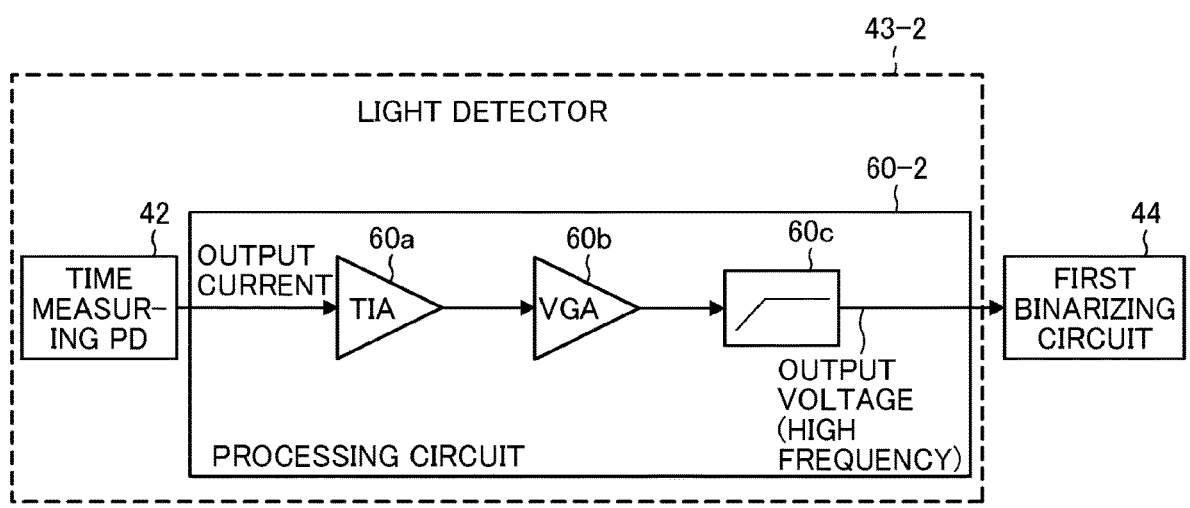
FIG. 3B is a diagram illustrating a second configuration of a light detector, according to an embodiment of the present disclosure.

FIG. 3A and FIG. 3B are diagrams illustrating a light detector 43-1 and another light detector 43-2, respectively, as example configurations of the first light detector 43, according to the present embodiment.

As illustrated in FIG. 3A and FIG. 3B, the first light detector 43 includes the time measuring photodiode 42 and a processing circuit 60 (60-1 or 60-2). The time measuring photodiode 42 serves as a photoreceptor, and receives the light that is emitted from the projection optical system 20 and reflected or scattered by an object within the effective scan area, through the light receiving optical system 30. The processing circuit 60 (60-1 or 60-2) processes the electric current output from the time measuring photodiode 42.

As illustrated in FIG. 3A and FIG. 3B, each of the processing circuits 60-1 and 60-2 of the first light detector 43 includes a current-voltage converter 60a, such as a transimpedance amplifier (TIA), and a signal amplifier 60b such as a high-linearity analog variable-gain amplifier (VGA). The current-voltage converter 60a converts the output current (current value) from the time measuring photodiode 42 into a voltage signal (voltage value). The signal amplifier 60b amplifies the voltage signal output from the current-voltage converter 60a. The processing circuit 60-2 includes a high-pass filter (HPF) 60c in the subsequent stage of the signal amplifier 60b.

The first binarizing circuit 44 binarizes an analog voltage signal (detected light signal) output from the processing circuit 60 of the first light detector 43 based on a threshold voltage value and outputs the binarized signal (digital signal) as a detected signal to the time measuring device 45.

As illustrated in FIG. 2A and FIG. 1, the synchronous system 50 is provided with an imaging lens 52, a second light detector 53, and a binarizing circuit (comparator) 56. The imaging lens 52 is disposed in an optical path of the light that is emitted from the laser diode and is reflected by the reflecting mirror 24 after passing through the coupling lens 22, and then is deflected by the rotating mirror 26 and is reflected by the reflecting mirror 24 again. The second light detector 53 is provided with a synchronous detection photodiode 54 that serves as a photoreceptor and is disposed in the optical path of the light having passed through the imaging lens 52 and a processing circuit that processes the electric current output from the synchronous detection photodiode 54. The binarizing circuit (comparator) 56 binarizes the voltage output from the second light detector 53.

The processing circuit of the second light detector 53 has a configuration similar to that of the processing circuit 60-1 or the processing circuit 60-2 of the first light detector 43.

The reflecting mirror 24 is disposed upstream from the range of deflection in the direction of rotation of the rotating mirror 26, and the light deflected by the rotating mirror 26 towards upstream from the range of deflection enters the reflecting mirror 24. The light deflected by the rotating mirror 26 and reflected by the reflecting mirror 24 passes through the imaging lens 52 and enters the synchronous detection photodiode 54. Then, the synchronous detection photodiode 54 outputs the electric current to a processing circuit in the second light detector 53.

Note that, in some embodiments, the reflecting mirror 24 may be disposed downstream from the range of deflection in the direction of rotation of the rotating mirror 26. Further, the synchronous system 50 may be disposed in the optical path of the light deflected by the rotating mirror 26 and reflected by the reflecting mirror 24.

The rotating mirror 26 rotates to guide the light reflected by the reflection plane of the rotating mirror 26 to the reflection plane, and the light reflected by the reflection plane enters the synchronous detection photodiode 54. The synchronous detection photodiode 54 that has received the light outputs electric current upon each receipt of light. In other words, the synchronous detection photodiode 54 periodically outputs electric current.

The light emission for synchronization described above, which irradiates the synchronous detection photodiode 54 with light deflected by the rotating mirror 26, allows obtaining the timing of rotation of the rotating mirror 26 based on the timing at which the synchronous detection photodiode 54 receives light.

With elapse of a predetermined length of time after the laser diode emits light for synchronization, the light source 10 emitting pulsed light allows the effective scan area to be optically scanned. In other words, the laser diode emits pulsed light during a period of time before and after the timing of illuminating the synchronous detection photodiode 54, thereby optically scanning the effective scan area.

In this case, examples of the photoreceptor for measuring time and detecting synchronization include a photo diode (PD) as described above, an avalanche photodiode (APD), and a single photon avalanche diode (SPAD) as a Geiger mode APD. The APD and the SPAD have higher sensitivity than a PD, and thus are advantageous in accuracy of detection or the detection distance.

A binarizing circuit 56 binarizes an analog voltage signal output from the processing circuit of the second light detector 53 based on a threshold voltage value and outputs the binarized signal (digital signal) to the measurement controller 46 as a synchronizing signal.

The measurement controller 46 generates a LD drive signal based on the synchronizing signal obtained from the binarizing circuit 56, and outputs the LD drive signal to the LD driver 12 and the time measuring device 45. In other words, the LD driving signal is a light emission control signal (periodic pulsed signal) which is delayed relative to the synchronizing signal.

When the LD driver 12 receives the LD driving signal, the LD driver 12 applies a driving current to the laser diode, and the laser diode outputs a light-emitting pulse. In the present embodiment, the duty of the pulsed light emitted from the laser diode is restricted in view of the safety and durability of the laser diode. Accordingly, it is desired that the pulse width of the pulsed light emitted from the laser diode be narrow. As known in the art, the pulse width is set in range from approximately 10 ns through approximately several tens of ns, and the pulse interval is approximately several tens of microseconds.

The time measuring device 45 calculates a time difference between the timing of light emission of the laser diode and the timing of light reception of the time measuring photodiode 42, based on the LD driving signal output from the measurement controller 46 and the detected signal (binarized signal) output from the first binarizing circuit 44, and outputs the calculated time difference to the measurement controller 46 as a result of timing measurement.

The measurement controller 46 converts the measurement result of the time measuring device 45 into distance to obtain a round-trip distance to and from an object, and outputs one-half of the round-trip distance as distance data to the object recognition unit 47. The object recognition unit 47 recognizes the position, shape, or the size of an object based on a plurality of sets of distance data obtained by one or more times of scanning, and outputs an object recognition result to the measurement controller 46. The measurement controller 46 transfers the object recognition result to the ECU.

For example, the ECU performs steering control for a vehicle such as auto steering and speed control such as auto braking, based on the transferred object recognition result.

In the following description, cases in which the object detector 100 is of a non-scanning type are also taken into consideration in addition to the cases in which the object detector 100 is of a scanning type. In non-scanning object detectors, for example, the light is emitted from a light emitting element in a direct manner or through a lens.

In a system where a received-light signal (i.e., the signal output from the first light detector 43) is detected with reference to a threshold, the threshold voltage $V_{th}$ needs to be sufficiently increased relative to the noise in order to prevent erroneous detection due to the noise. However, if the threshold voltage is set too high, the measurable maximum range tends to be narrowed.

As the intensity distribution of shot noises follows the normal distribution where the average is 0, however high $V_{th}$ may be set, there should exist a shot noise where the peak intensity exceeds $V_{th}$ in view of the probability. For this reason, when it is simply determined that a signal whose peak intensity exceeds $V_{th}$ is always a signal caused by light reflected from an object, erroneous detection tends to occur especially in environments where there are many shot noises.

In view of the above circumstances, it is desired that $V_{th}$ be determined in view of the shot noises. When the intensity of shot noises is defined to follow a standard deviation $\sigma_{sn}$ as in the intensity distribution illustrated in FIG. 4 and $V_{th}$ is equal to $\sigma_{sn}$, the incidence of shot noise where the peak intensity exceeds $V_{th}$ is 15.87%.

When it is assumed that the measurable maximum range is, for example, 180 meters (m) at an any desired angle of the rotating mirror 26 (in a desired light-emitting direction), the length of time it takes for the light to travel both ways between the object detector 100 and the object is expressed as follows.

$$180 \times 2/(3 \times 10^8) = 1.2\ \mu s$$

The data the object detector 100 can obtain the time of rise $t_r$ and time of fall $t_f$ of a signal from the first binarizing circuit 44. Accordingly, when a signal caused by light reflected from an object (such a signal may be referred to simply as "a signal from an object" in the following description) is to be separated from shot noises, cases in which the pulse width $\omega_{obj}$ of a signal from an object ($=t_f-t_r$)(where "$\omega_{obj}$=20 nanoseconds (ns)" in the present embodiment) is about the same as the pulse width $\omega_{sn}$ of shot noises ($=t_f-t_r$) are most difficult. Note that $\omega_{obj}$ is considered to be approximately same as the pulse width of the LD driving signal.

There are 60 (=1.2 μs/20 ns) such shot noises in 180 m that are hard to be distinguished from a signal from an object. However, there should be only 9.5 (=60×0.1587) shot noises whose peak intensity exceeds $V_{th}$ in view of the probability.

In view of the above circumstances, as long as the eleven signals that are obtained at the same desired angle of the rotating mirror 26 are processed by the first binarizing circuit 44 and the processing circuit 60-1 or 60-2, the signals from an object can certainly be detected.

Figure 4:
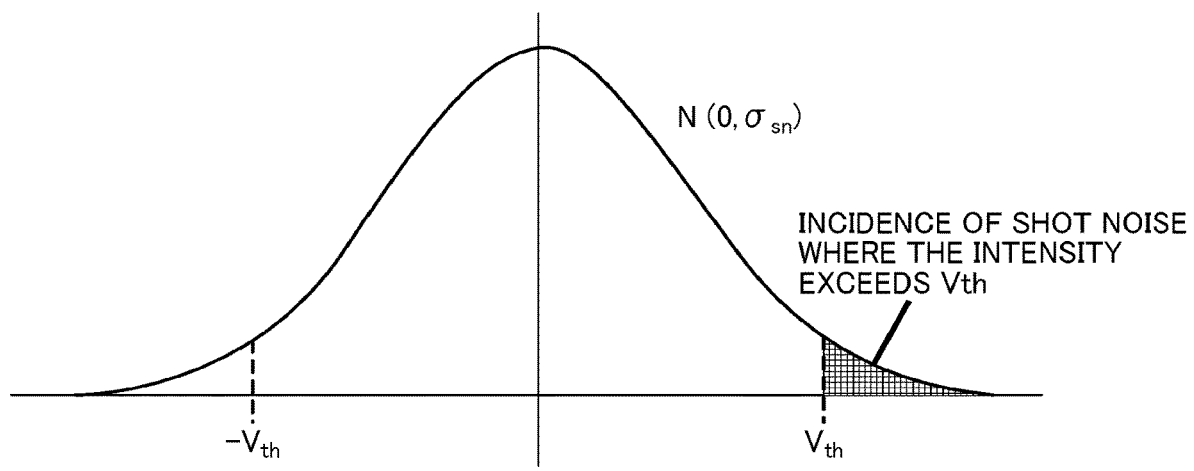
FIG. 4 is a graph illustrating the intensity distribution of shot noises, according to an embodiment of the present disclosure.

For purposes of simplification, it is assumed that the intensity distribution of shot noises follows the normal distribution $N(0, \sigma_{sn})$ as illustrated in FIG. 4. In this normal distribution, the area from the horizontal axis (X-axis) at infinity to any desired X-coordinate is defined as a standard normal cumulative distribution function $F(x, 0, \sigma_{sn})$. Accordingly, when $x=V_{th}$, the incidence of shot noise where the peak intensity exceeds $V_{th}$ (as indicated by the shaded portion in FIG. 4) can be expressed as follows. $1-F(V_{th}, 0, \sigma_{sn})=F(-V_{th}, 0, \sigma_{sn})$ In the embodiment as described above, it was assumed that $V_{th}$ was equal to $\sigma_{sn}$, and thus the incidence of shot noise is found to be 15.87%. However, when $V_{th}=2\sigma_{sn}$, the incidence of shot noise becomes 2.27%. When $V_{th}=3\sigma_{sn}$, the incidence of shot noise becomes 0.13%.

When it is assumed that the maximum distance that the object detector 100 can measure in the present embodiment is "L" and the speed of light is "c," the length of time it takes for the light to travel both ways between the object detector 100 and the object is expressed as follows.

$$2L/c$$

As the pulse width $\omega_{sn}$ of shot noise to be taken into consideration is almost equal to the pulse width $\omega_{obj}$ of a signal from an object (≈the pulse width of the LD driving signal), the number of shot noises where the peak intensity exceeds $V_{th}$ is indicated as follows in [Formula 1].

$$F(-V_{th}, 0, \sigma_{sn}) \times \frac{2L}{c} \times \frac{1}{\omega_{obj}} \qquad \text{[Formula 1]}$$

Figure 5:
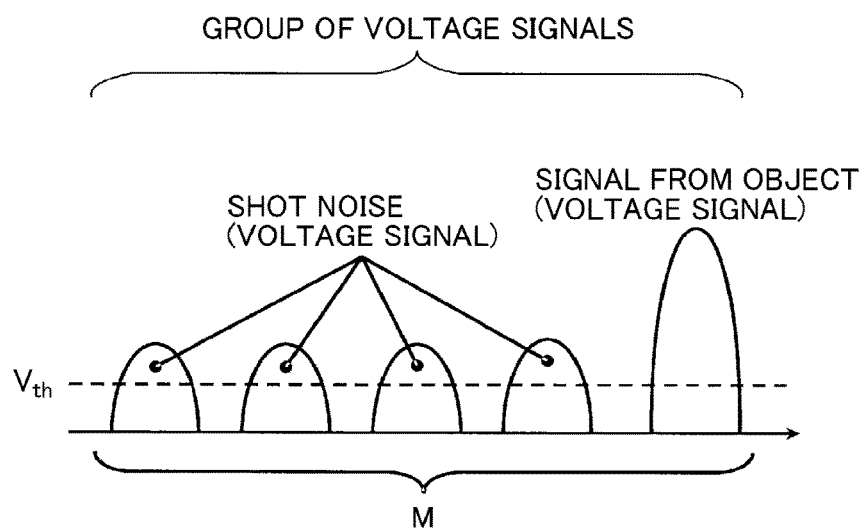
FIG. 5 is a diagram illustrating a method of detecting a signal from an object, according to an embodiment of the present disclosure.

In view of the above circumstances, the signals from an object can certainly be detected as the first binarizing circuit 44 performs binarization until a binarized signal (high-level signal) is output M times ("M" is defined in Formula 2 as given below) when the light is emitted in the same desired direction (see FIG. 5).

$$M \geq F(-V_{th}, 0, \sigma_{sn}) \times \frac{2L}{c} \times \frac{1}{\omega_{obj}} + 1 \qquad \text{[Formula 2]}$$

In particular, when M takes a minimum value in [Formula 2] as above, i.e., when the left side is equal to the right side in the [Formula 2], the signals from an object can be detected with reliability while the number of times signal conditioning is performed can be reduced to a minimum (i.e., while the processing speed is enhanced to a maximum).

For example, the above case is developed as follows. Given that L=180 m and the cutoff frequency $f_c$ of a high-pass filter (HPF) is 25 megahertz (MHz), M=3 when $V_{th}=2\sigma_{sn}$, and M=2 when $V_{th}=3\sigma_{sn}$.

Note also that the value of M may be determined in advance, and $V_{th}$ may be determined so as to satisfy the [Formula 2] as above.

Next, a concrete example of a method of extracting a signal from an object is briefly described. Shot noises have varying pulse widths. The light is received by the time measuring photodiode 42, and the data (binarized signal) that is processed by the first binarizing circuit 44 indicates the combination ($t_r$, $t_f$) of the time of rise $t_r$ and the time of fall $t_f$ where the value of signal goes beyond $V_{th}$. The pulse width of signal $\omega(=t_f-t_r)$ is calculated and obtained based on the above combination, and signals where the difference between $\omega$ and $\omega_{obj}$ is equal to or greater than a predetermined level are all excluded as shot noises. The remaining signals are considered to be signals from an object or shot noises that are hard to be distinguished from the signals from the object. However, shot noises appear at random. In view of the above circumstances, when the rotating mirror 26 fully rotates around and the angle of the rotating mirror 26 becomes the same again, it is extremely rare for the shot noise to occur at the same position. Accordingly, a plurality of light signals (analog signals) that are output from the first light detector 43 at the same angle of the rotating mirror 26 (in the same light-emitting direction) may be averaged to separate between shot noises and signals from the object.

Figure 6A:
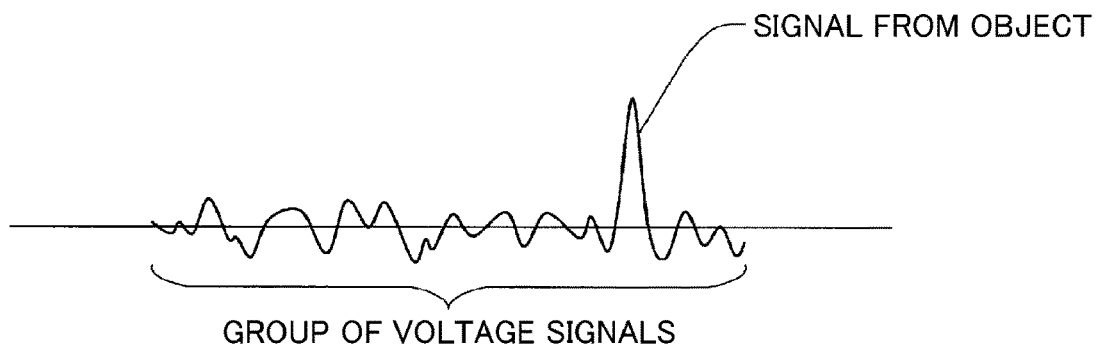
FIG. 6A to FIG. 6C are diagrams illustrating how a signal from an object can be extracted due to averaging, according to an embodiment of the present disclosure.
Figure 6B:
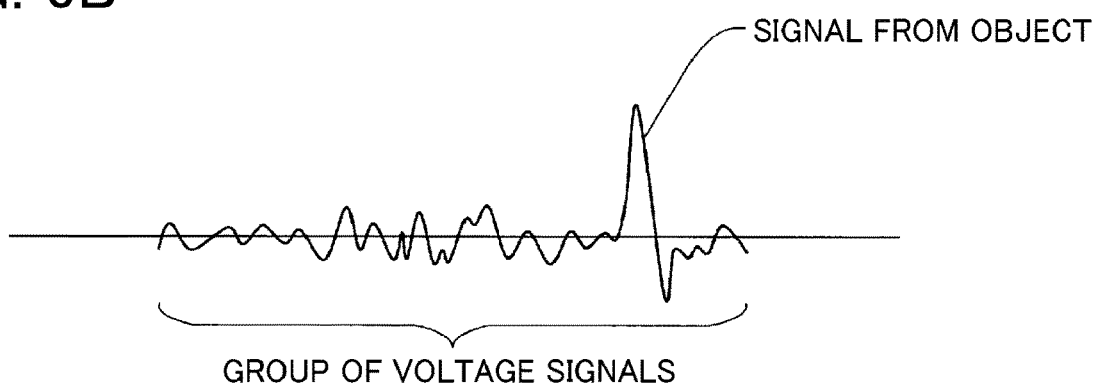
Figure 6C:
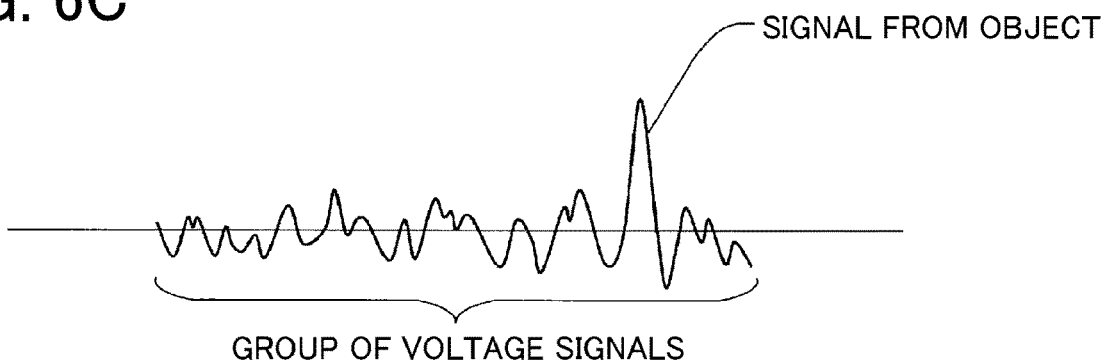

For example, it is assumed that signals are momentarily obtained as illustrated in FIG. 6A at a certain angle of the rotating mirror 26. Then, when the rotating mirror 26 fully rotates around and reaches the same angle, signals are obtained again as illustrated in FIG. 6B. Further, when the rotating mirror 26 fully rotates around again and reaches the same angle, signals are obtained as illustrated in FIG. 6C.

While shot noises occur at random spatially in accordance with a normal distribution, the signals from an object always exist at the same position. For this reason, when the signals in FIG. 6A to FIG. 6C are added up and divided by three (in other words, when the signals are averaged), only the signals from an object remain as the signals that go beyond $V_{th}$.

When such averaging is performed as above, a signal from the object does not necessarily exist in every signal acquisition. This is because there is no possibility that a shot noise whose intensity has become approximately zero due to the averaging goes beyond $V_{th}$ and there is no concern that signals are erroneously detected.

More specifically, when N denotes the number of times the above averaging is performed, there is an effect that the value of $V_{th}$ is relatively reduced according to the value of N. In view of the above circumstances, the signals from an object can certainly be detected as the first binarizing circuit 44 performs binarization until a binarized signal (high-level signal) is output from the first binarizing circuit 44 M times ("M" is defined in Formula 3 as given below) when the light is emitted in the same desired direction.

$$M \geq F(-V_{th}/N, 0, \sigma_{sn}) \times \frac{2L}{c} \times \frac{1}{\omega_{obj}} + 1 \qquad \text{[Formula 3]}$$

In particular, when M takes a minimum value in [Formula 3] as above, i.e., when the left side is equal to the right side in the [Formula 3], the signals from an object can be detected with reliability while the number of times signal conditioning is performed can be reduced to a minimum (i.e., while the processing speed is enhanced to a maximum).

Given that L=180 m and $f_c$=25 MHz, M=11 when $V_{th}=\sigma_{sn}$. However, when averaging is performed three times, M=2 is acceptable. In other words, the processing time, which is required every time light is emitted, at the processing circuit and the first binarizing circuit 44 can be reduced. Note also that the value of M may be determined in advance, and $V_{th}$ may be determined so as to satisfy the [Formula 3] as above.

Figure 7:
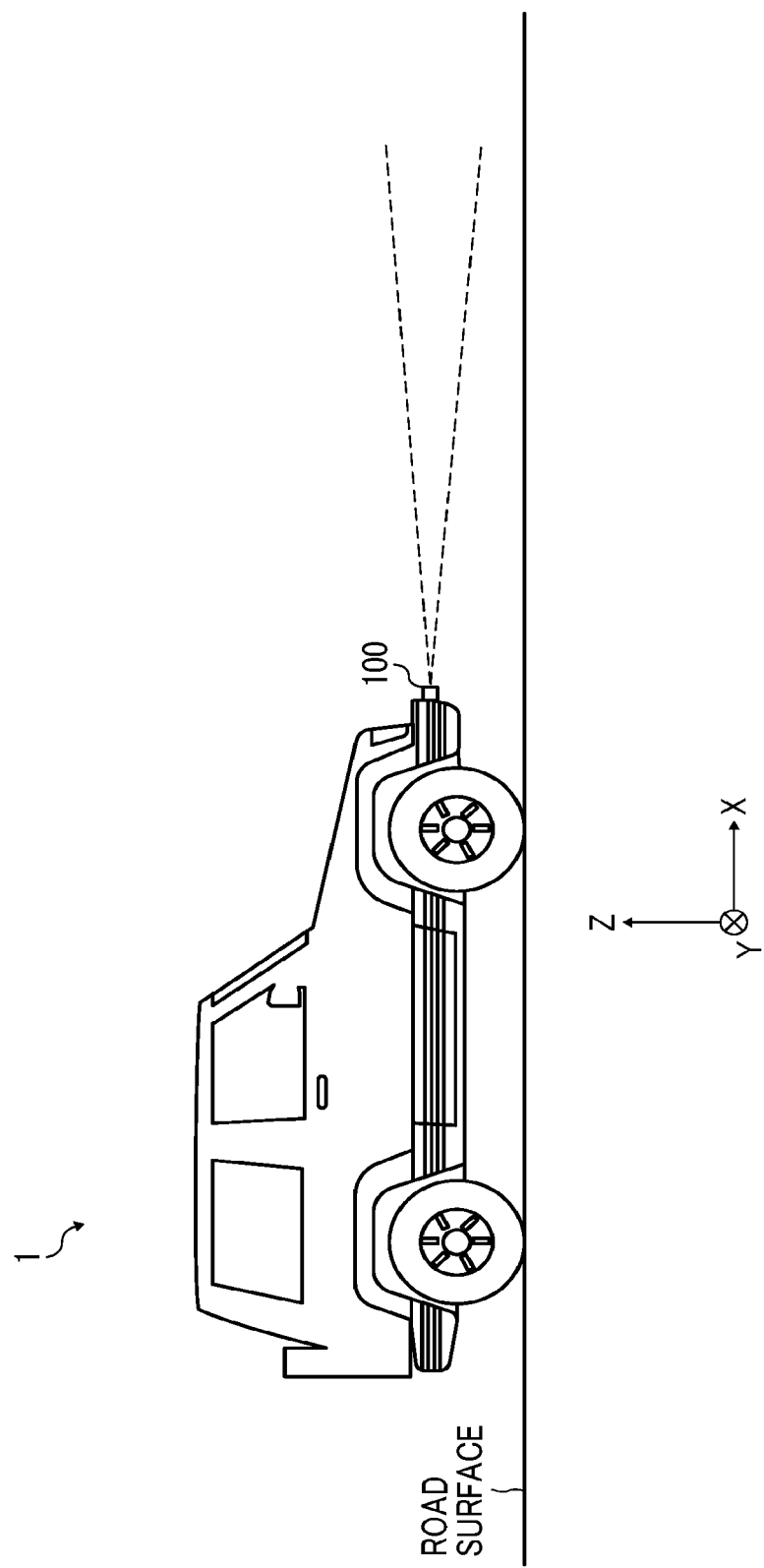
FIG. 7 is a diagram illustrating an external appearance of a vehicle provided with an object detector, according to an embodiment of the present disclosure.

FIG. 7 is a diagram illustrating an external appearance of the vehicle 1 for which the object detector 100 is provided, according to the present embodiment.

In FIG. 7, the vehicle 1 is a car that serves as a mobile object.

The object detector 100 is fitted, for example, to a portion near the license plate disposed at the front of the vehicle 1. In the XYZ three-dimensional rectangular coordinate system of the present disclosure, it is assumed that the direction orthogonal to the road surface is the Z-axis direction, and that the directions of travel of the vehicle 1 is the +X-direction.

Figure 8:
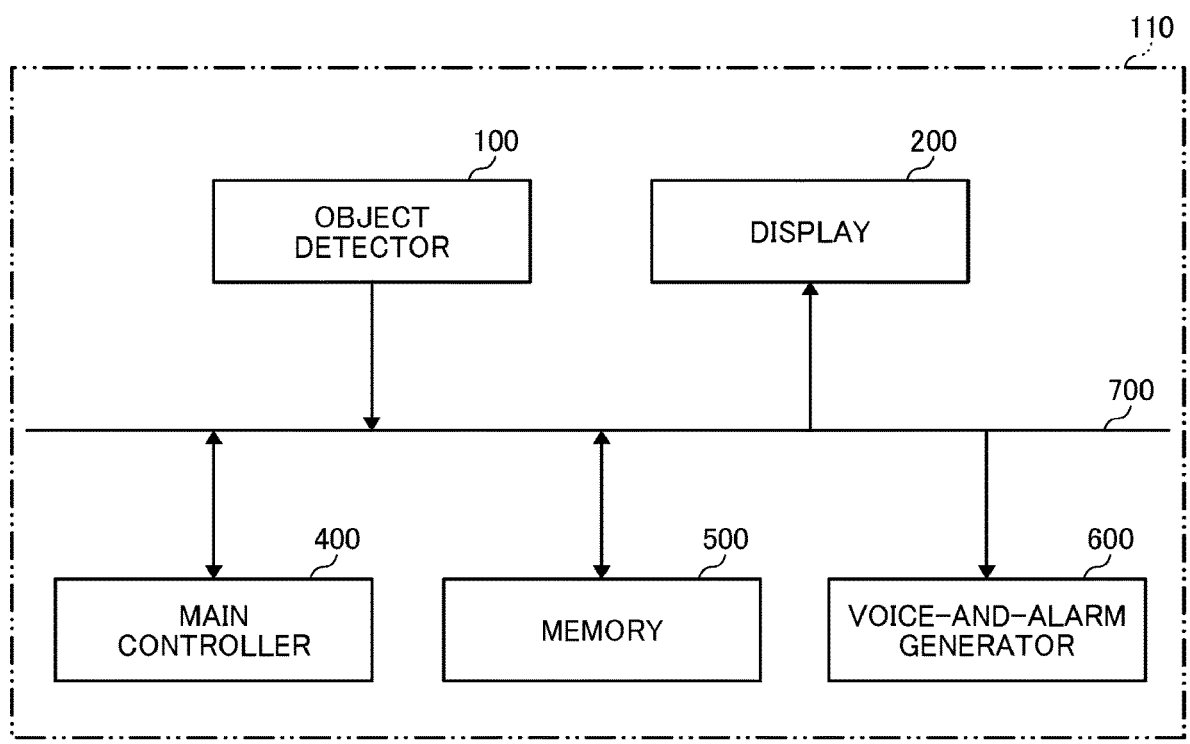
FIG. 8 is a schematic block diagram of a monitoring apparatus according to an embodiment of the present disclosure.

As illustrated in FIG. 8, for example, the vehicle 1 is provided with a display 200, a main controller 400, a memory 500, and a voice and alarm generator 600 that make up the monitoring apparatus 110 together with the object detector 100. The elements of the monitoring apparatus 110 are electrically connected to each other through a bus 700 through which data can be transmitted.

When there is an object ahead of the vehicle 1, the main controller 400 determines whether or not the object has moved based on the object information stored in the memory 500, at prescribed time intervals, and obtains the movement information of the object such as the moving direction and speed of the object when it is determined that the object has moved. Then, the main controller 400 controls the display 200 to display the object information and the movement information.

When the main controller 400 determines that there is a danger based on the object information and the movement information, the main controller 400 outputs alarm information to the voice and alarm generator 600.

Figure 9:
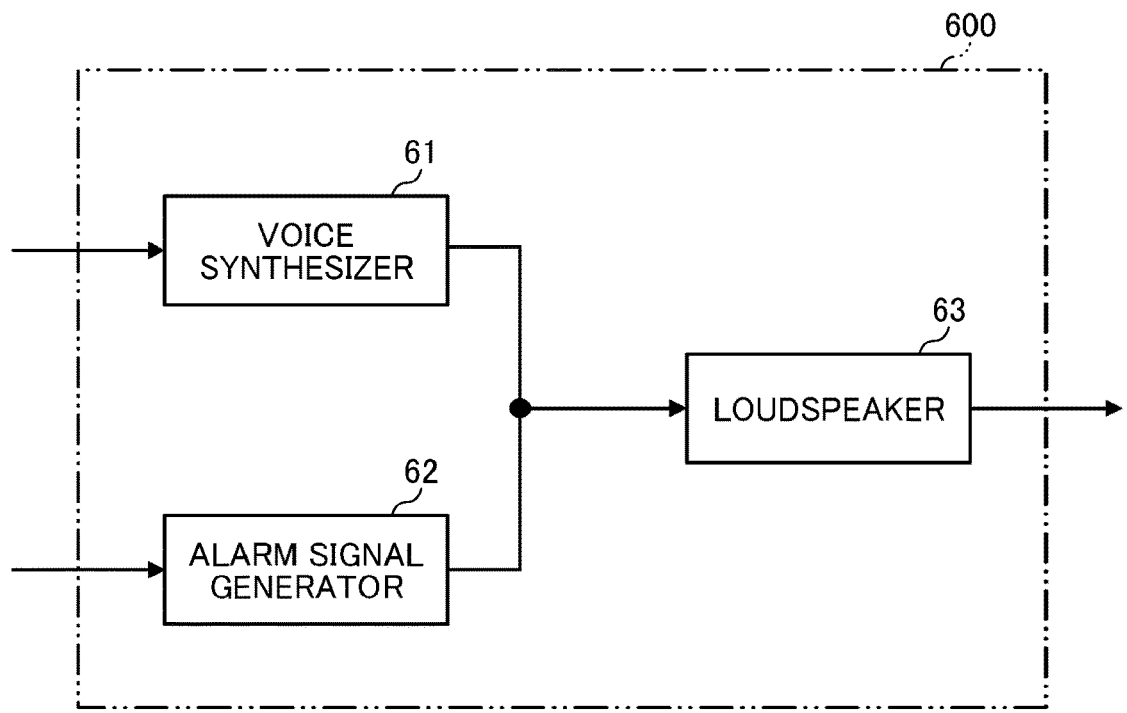
FIG. 9 is a schematic block diagram of a voice and alarm generator according to an embodiment of the present disclosure.

As illustrated in FIG. 9, the voice and alarm generator 600 according to the present embodiment includes, for example, a voice synthesizer 61, an alarm signal generator 62, and a loudspeaker 63.

The voice synthesizer 61 has a plurality of pieces of voice data, and when the alarm information is received from the main controller 400, the voice synthesizer 61 selects the corresponding piece of voice data and outputs the selected piece of voice data to the loudspeaker 63.

When the alarm information is received from the main controller 400, the alarm signal generator 62 generates the corresponding alarm signal and outputs the selected alarm signal to the loudspeaker 63.

As understood from the above description, the monitoring controller of the sensing device according to an embodiment of the present disclosure is configured by the main controller 400, the memory 500, and the voice and alarm generator 600.

Figure 10:
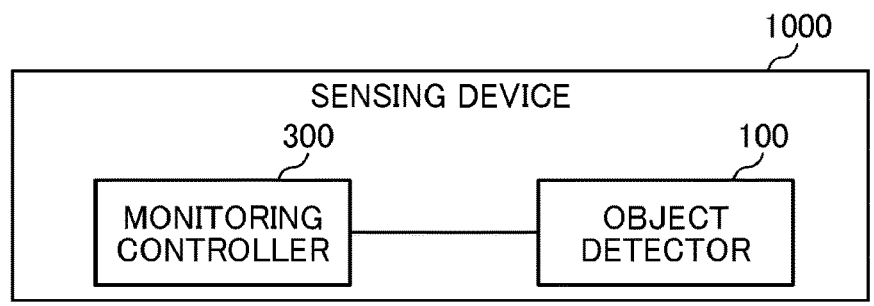
FIG. 10 is a schematic block diagram of a sensing device according to an embodiment of the present disclosure.

FIG. 10 is a diagram illustrating a schematic view of a sensing device 1000 provided with the object detector 100, according to the present embodiment.

The sensing device 1000 is mounted on a mobile object, and includes the object detector 100 and a monitoring controller 300 that is electrically connected to the object detector 100. The object detector 100 is mounted near a bumper or a rear-view mirror of the vehicle. The monitoring controller 300 performs processes such as estimation of the size or shape of an object, calculation of the position and movement information of the object, recognition of the type of object, based on the detection results of the object detector 100. According to the results of these processes, the monitoring controller 300 determines whether there is a danger. When the monitoring controller 300 has detected the presence of danger, for example, the monitoring controller 300 alerts an operator of the mobile object to the danger, or sends instructions to a steering controller of the mobile object to avoid the danger by controlling a steering wheel. Moreover, the monitoring controller 300 may send instructions to the ECU to brake the mobile object. In other words, the monitoring controller 300 has a function to detect the presence or absence of danger and a function to send instructions to avoid danger, in addition to the functions of the object recognition unit 47. Note also that the sensing device 1000 is supplied with power, for example, from a battery of the vehicle.

The monitoring controller 300 may be integrated into the object detector 100. Alternatively, in some embodiment, the monitoring controller 300 may be separated from the object detector 100. In some embodiments, the monitoring controller 300 may perform at least some of the control performed by the ECU.

When the object detector 100 is manufactured, the number of times (the number of light-emitting pulses) M the first binarizing circuit 44 outputs a pulse signal (high-level signal) may be determined based on the incidence of shot noise where the peak intensity exceeds the threshold $V_{th}$ (such an incidence of shot noise as illustrated in FIG. 4 may be referred to simply as "incidence" in the following description). More specifically, when the light is emitted in the same desired direction (in the direction the light incident on the rotating mirror 26 at the same desired rotation angle is reflected) and a high-level signal has been output from the first binarizing circuit 44 M times, the signal processing is terminated. More specifically, for example, when the incidence is ⅘, "M" is set to "5."

When the light is emitted in the same desired direction in the above configuration, there is probability that a single high-level signal among the five output high-level signals is considered to be a signal caused by light reflected from an object (see FIG. 5), and signals from the object can be obtained while shortening the length of time required for performing signal processing.

For purposes of simplification, it is assumed that "n" denotes a natural number and the incidence is compared with (n−1)/n. When the incidence is equal to (n−1)/n, it is desired that signal processing be terminated when a high-level signal is output n times. When the incidence is not equal to (n−1)/n, the incidence may be replaced with (n−1)/n that is closest to the incidence. When "n" denotes a natural number and the incidence is equal to (n−1)/n, a high-level signal may be output (n+1) times or more. In such a configuration, the length of time it takes for signal processing becomes longer to some degree.

Alternatively, the number of times M the first binarizing circuit 44 outputs a high-level signal may be determined when the object detector 100 is manufactured, and the threshold $V_{th}$ may be set based on the set value (i.e., the determined number of times M). By so doing, the incidence of shot noise where the peak intensity exceeds the threshold $V_{th}$ (see FIG. 4) may be determined. More specifically, for example, when M is set to five, the threshold $V_{th}$ may be determined such that the incidence will be, for example, ⅘. When the light is emitted in a desired direction in the above configuration, there is probability that a single high-level signal among the five output high-level signals is considered to be a signal caused by light reflected from an object (see FIG. 5), and signals from the object can be obtained while shortening the length of time required for performing signal processing. As described above, when "n" denotes a natural number, the target incidence can approximately be expressed as (n−1)/n. Alternatively, $V_{th}$ may be set to a higher value in order to lower the incidence, for example, from ⅘ to ⅗, ⅖, or ⅕. However, as the value of $V_{th}$ is increased, there is a greater likelihood that the peak of a signal from an object (in particular, the peak of a weak signal) does not go beyond $V_{th}$. For this reason, it is not always a good idea to set $V_{th}$ too high (or lower the incidence to an excessive degree).

Figure 11:
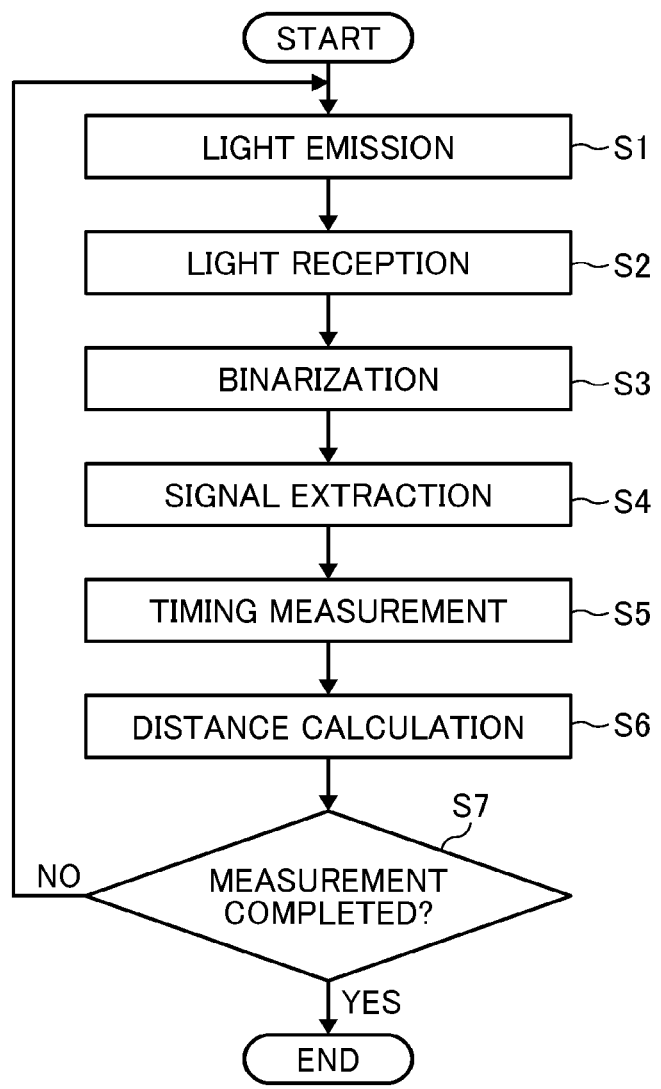
FIG. 11 is a flowchart of the first distance measuring processes, according to an embodiment of the present disclosure.

FIG. 11 is a flowchart of the first distance measuring processes performed by the object detector 100, according to the present embodiment.

In a first step S1, light is emitted. More specifically, the measurement controller 46 generates a LD drive signal, and light is emitted in a desired direction (towards a scanning position) in the effective scanning area.

In a next step S2, light is received. More specifically, the first light detector 43 receives light when the light is emitted as above in a desired direction, and obtains a voltage signal by performing photoelectric conversion and current-voltage conversion on the received light. When necessary, the signal is amplified and low frequency is cut in the received light. Then, the first light detector 43 outputs the obtained voltage signal to the first binarizing circuit 44.

In a next step S3, binarization is performed. More specifically, the first binarizing circuit 44 binarizes the received multiple voltage signals, and outputs a high-level signal to the time measuring device 45. More specifically, when the number of times (number of counts) a high-level signal is output from the first binarizing circuit 44 to the time measuring device 45 satisfies "M" in Formula 2 as above, the time measuring device 45 terminates the signal processing being performed at the processing circuit 60-1 or the processing circuit 60-2 and the first binarizing circuit 44, and after a certain length of time has elapsed, the time measuring device 45 initializes the number of counts to "0" in preparation for light projection in the direction light is to be emitted subsequently.

In a next step S4, a signal is extracted. More specifically, the time measuring device 45 compares the pulse widths of the received M high-level signals with the pulse widths of the LD driving signal (whose pulse width is approximately equivalent to that of the light signal), and extracts a high-level signal whose pulse width is closest to the pulse width of the LD driving signal as a signal from the object.

In a next step S5, timing measurement is performed. More specifically, the time measuring device 45 calculates the timing at which the first light detector 43 receives light based on the received high-level signal, and outputs the time difference between the timing of light reception and the timing of light emission by a laser diode to the measurement controller 46.

In a next step S6, distance calculation is performed. More specifically, the measurement controller 46 calculates the distance to the object based on the received time difference, and outputs the calculated distance data to the object recognition unit 47.

In a next step S7, the measurement controller 46 determines whether or not the measurement is to be terminated. More specifically, when the electrical system of the vehicle 1 is switched off, the measurement controller 46 affirms the determination therein and terminates the flow. In the other cases, the measurement controller 46 denies the determination therein, and return the process to the step S1 and continues the measurement. In the present embodiment, it is assumed that an effective scanning area is scanned one time in one loop of step S1 to step S7.

Note also that some of the multiple steps in the flowchart of FIG. 11 may be performed in parallel between scanning positions (in the light-emitting direction).

Figure 12:
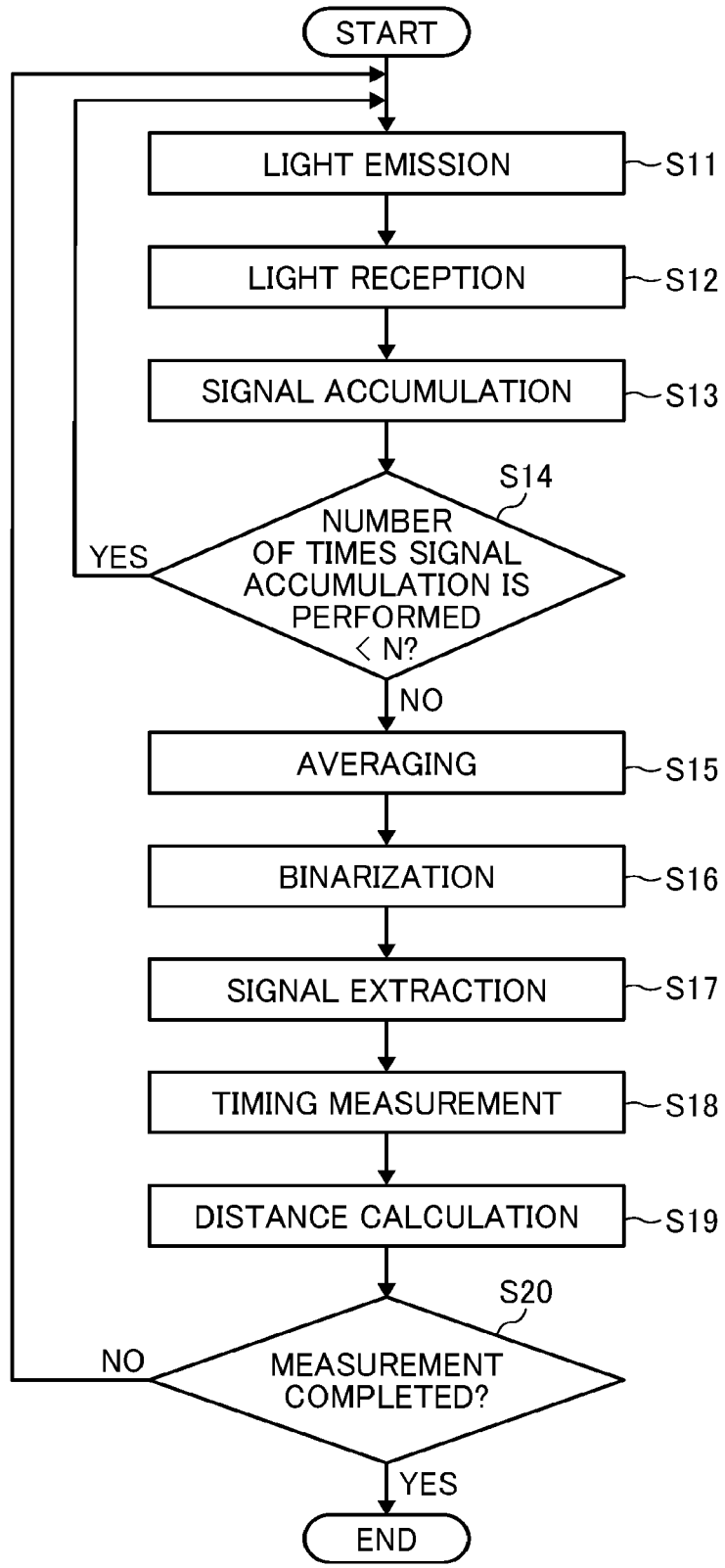
FIG. 12 is a flowchart of the second distance measuring processes, according to an embodiment of the present disclosure.

FIG. 12 is a flowchart of the second distance measuring processes performed by the object detector 100, according to the present embodiment.

FIG. 13A is a diagram illustrating a configuration of a detection system including a light detector 43-1, which is used for the second distance measuring processes, according to the present embodiment.

FIG. 13B is a diagram illustrating a configuration of a detection system including a light detector 43-2, which is used for the second distance measuring processes, according to the present embodiment.

In comparison to FIG. 3A and FIG. 3B, like reference signs in FIG. 13A and FIG. 13B denote like elements. In the present embodiment, as illustrated in FIG. 13A and FIG. 13B, an averaging circuit 51 is coupled between the first binarizing circuit 44 and the processing circuit 60-1 or the processing circuit 60-2. The controller 49 controls the averaging circuit 51.

In a first step S11, light is emitted. More specifically, the measurement controller 46 generates a LD drive signal, and light is emitted in a desired direction (towards a scanning position) in the effective scanning area.

In a next step S12, light is received. More specifically, the first light detector 43 receives light when the light is emitted as above in a desired direction, and obtains a voltage signal by performing photoelectric conversion and current-voltage conversion on the received light. When necessary, the signal is amplified and low frequency is cut in the received light.

In a next step S13, signals are accumulated. More specifically, the averaging circuit 51 accumulates the received voltage signals on a scanning-position-by-scanning-position basis (or on a light-emitting direction-by-light-emitting-direction basis) in the effective scanning area.

In a next step S14, whether the number of times signal accumulation is performed is less than N (N>1) is determined. More specifically, the controller 49 determines whether the number of accumulated voltage signals on a scanning-position-by-scanning-position basis is less than N. When the determination in the step S14 is affirmative, the process returns to the step S11. When the determination in step S14 is negative, the process proceeds to a step S15. When the process proceeds to the step S15, the controller 49 instructs the averaging circuit 51 to take the average of N voltage signals. In the present embodiment, it is assumed that an effective scanning area is scanned one time in one loop of step S11 to step S14.

In the step S15, averaging is performed. More specifically, the averaging circuit 51 averages the N voltage signals that are input on a scanning-position-by-scanning-position basis as instructed by the controller 49, and outputs the averaged voltage signal to the first binarizing circuit 44.

In a next step S16, binarization is performed. More specifically, as instructed by the controller 49, the first binarizing circuit 44 binarizes the received multiple voltage signals, and outputs a high-level signal to the time measuring device 45. More specifically, when the number of times (number of counts) a high-level signal is output from the first binarizing circuit 44 to the time measuring device 45 satisfies "M" in Formula 3 as above, the controller 49 terminates the signal processing being performed at the first binarizing circuit 44, and after a certain length of time has elapsed, the time measuring device 45 initializes the number of counts to "0" in preparation for light projection in the direction light is to be emitted subsequently.

In a next step S17, signal extraction is performed. More specifically, the time measuring device 45 compares the pulse widths of the received M high-level signals with the pulse widths of the LD driving signal (whose pulse width is approximately equivalent to that of the light signal), and extracts a high-level signal whose pulse width is closest to the pulse width of the LD driving signal as a signal from the object.

In a next step S18, timing measurement is performed. More specifically, the time measuring device 45 calculates the timing at which the first light detector 43 receives light based on the received high-level signal, and outputs the time difference between the timing of light reception and the timing of light emission by a laser diode to the measurement controller 46.

In a next step S19, distance calculation is performed. More specifically, the measurement controller 46 calculates the distance to the object based on the received time difference, and outputs the calculated distance data to the object recognition unit 47.

In a next step S20, the measurement controller 46 determines whether or not the measurement is to be terminated. More specifically, when the electrical system of the vehicle 1 is switched off, the measurement controller 46 affirms the determination therein and terminates the flow. In the other cases, the measurement controller 46 denies the determination therein, and return the process to the step S11 and continues the measurement.

Figure 14:
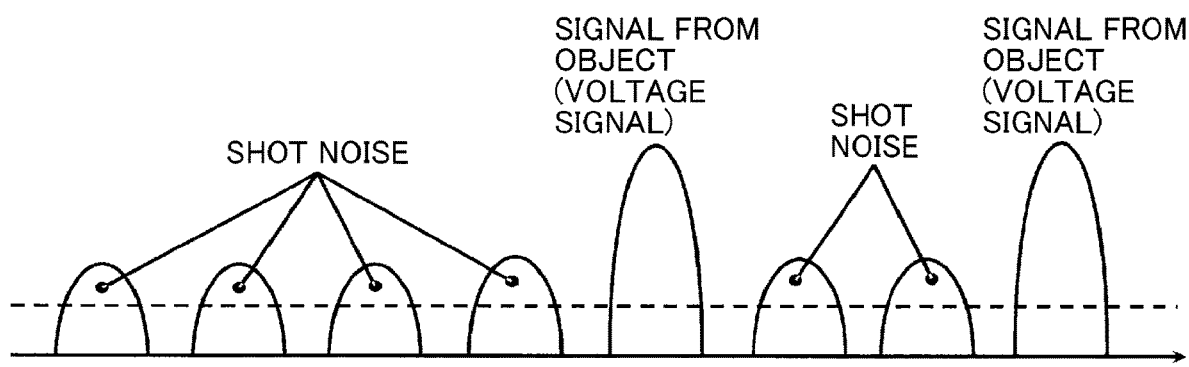
FIG. 14 is a first diagram used to explain the thinking process that led to the conception of an embodiment of the present disclosure.

Note also that some of the multiple steps in the flowchart of FIG. 14 may be performed in parallel between scanning positions (in the light-emitting direction).

With a first aspect of the object detector 100 according to the present embodiment as described above, the object detector 100 includes a light source (for example, a laser diode (LD)) configured to emit light, a photoreceptor (for example, a photodiode (PD)) configured to receive the light reflected by an object, and the first binarizing circuit 44 configured to binarize a signal sent from the photoreceptor at a threshold $V_{th}$. In the above object detector 100, object detection processes are performed in a same direction until a high-level signal is output M times from the signal binarized by the first binarizing circuit 44, and a value of the M is determined based on an incidence of shot noise where peak intensity exceeds the threshold $V_{th}$ in the photoreceptor. Note also that "an incidence of shot noise where peak intensity exceeds the threshold $V_{th}$ in the photoreceptor" is determined based on the intensity distribution of shot noises (see FIG. 4) and the threshold $V_{th}$. Accordingly, the configuration in which "the value of M is determined based on the above incidence" is synonymous with the configuration in which "the value of M is determined based on the threshold $V_{th}$ and the intensity distribution of shot noises."

With a second aspect of the object detector 100 according to the present embodiment, the object detector 100 includes a light source (for example, a laser diode (LD)) configured to emit light, a photoreceptor (for example, a photodiode (PD)) configured to receive the light reflected by an object, and the first binarizing circuit 44 configured to binarize a signal sent from the photoreceptor at a threshold $V_{th}$. In the above object detector 100, object detection processes are performed in a same direction until a high-level signal is output M times from the signal binarized by the first binarizing circuit 44, and a threshold $V_{th}$ is determined based on a value of the M.

With the object detector 100 according to the present embodiment, the signals from an object can be detected (binarized) regardless of the incidence of shot noise where the peak intensity exceeds the threshold $V_{th}$. As a result, erroneous detection can be reduced. In the object detector 100 according to the present embodiment, a configuration in which light is emitted in a plurality of directions is adopted. However, a configuration in which light is emitted in a single direction may be adopted.

It is desired that the value of M be greater than the number of shot noises. In such a configuration, the signals from an object can be detected (binarized) with reliability.

In particular, is desired that the value of M be greater than the number of shot noises by just one. In such a configuration, the signals from an object can be detected (binarized) with reliability while the number of times signal conditioning is performed can be reduced to a minimum (i.e., while the processing speed is enhanced to a maximum).

When L denotes a maximum distance to the object detectable by the object detector 100, $\omega_{obj}$ denotes a pulse width of a signal that originates from the light reflected by the object, $\sigma_{sn}$ denotes a standard deviation of the shot noise, c denotes speed of light, and when $F(V_{th}, 0, \sigma_{sn})$ denotes a standard normal cumulative distribution function, $M \geq F(-V_{th}, 0, \sigma_{sn}) \times (2L/c) \times (1/\omega_{obj}) + 1$ it is desired that the following equation be satisfied. In such a configuration, the signals from an object can be detected with reliability.

An averaging circuit 51 may further be included that is configured to take an average of a group of N signals, each including a plurality of signals, that are input when the light is emitted N times in the same direction. In such a configuration, when L denotes a maximum distance to the object detectable by the object detector 100, $\omega_{obj}$ denotes a pulse width of a signal that originates from the light reflected by the object, $\sigma_{sn}$ denotes a standard deviation of the shot noise, c denotes speed of light, and when $F(V_{th}, 0, \sigma_{sn})$ denotes a standard normal cumulative distribution function, $M \geq F(-V_{th}/N, 0, \sigma_{sn}) \times (2L/c) \times (1/\omega_{obj}) + 1$ it is desired that the following equation be satisfied. As a result, the signals from an object can be detected with reliability.

It is desired that the high-level signal that originates from the light reflected by an object be extracted from M high-level signals based on the pulse widths of the M high-level signals.

It is desired that the timing at which the photoreceptor receives light be calculated and obtained based on the binarized signal that originates from the light reflected by an object, and it is desired that the distance to the object be calculated and obtained based on the timing at which light is emitted by a light source and the timing of light reception.

The light source emits the light in multiple directions, and the shape of the object may be estimated based on the distance to the object in the multiple directions.

According to the sensing device 1000 provided with the object detector 100 according to the present embodiment, and the monitoring controller 300 that obtains movement information of the object including at least one of the presence or absence of movement of the object, the moving direction, and the speed of the object, based on output from the object detector 100, the object information can be obtained with a high degree of precision.

The object detector 100 according to the present embodiment may further include the display 200 that displays at least one of the position information and movement information of the object. Due to this configuration, at least one of the position information and movement information of the object can be displayed with a high degree of precision.

The sensing device 1000 is mounted on the mobile object, and the monitoring controller 300 determines the presence of danger based on at least one of the position information and movement information of the object. Due to this configuration, for example, a control processor or speed processor of the mobile object can be provided with effective data for avoiding danger.

With a mobile object (for example, a vehicle apparatus) provided with a mobile object (for example, the vehicle 1) and the sensing device 1000 according to the present embodiment provided for the mobile object, a high level of security in collision avoidance can be achieved.

With a first aspect of a method of detecting an object according to the present embodiment, the method includes a step of emitting light in a plurality of directions, a step of receiving the light reflected by an object using a photoreceptor (for example, a photodiode), a step of detecting object information, and a step of performing processes including binarizing a signal sent from the photoreceptor at a threshold $V_{th}$. In this method, object detection processes are performed in a same direction until a high-level signal is output M times from the signal binarized by the step of binarizing, and a value of the M is determined based on an incidence of shot noise where peak intensity exceeds the threshold $V_{th}$ in the photoreceptor.

With a second aspect of a method of detecting an object according to the present embodiment, the method includes a step of emitting light in a plurality of directions, a step of receiving the light reflected by an object using a photoreceptor (for example, a photodiode), a step of detecting object information, and a step of binarizing a signal sent from the photoreceptor at a threshold $V_{th}$. In this method, object detection processes are performed in a same direction until a high-level signal is output M times from the signal binarized by the step of binarizing, and a threshold $V_{th}$ is set based on a value of the M.

With the object detection method according to the present embodiment, the signals from an object can be detected (binarized) regardless of the incidence of shot noise where the peak intensity exceeds the threshold $V_{th}$. As a result, erroneous detection can be reduced.

When L denotes a maximum distance to the object detectable by the method of detecting an object, $\omega_{obj}$ denotes a pulse width of a signal that originates from the light reflected by the object, $\sigma_{sn}$ denotes a standard deviation of the shot noise, c denotes speed of light, and when $F(V_{th}, 0, \sigma_{sn})$ denotes a standard normal cumulative distribution function, $M \geq F(-V_{th}, 0, \sigma_{sn}) \times (2L/c) \times (1/\omega_{obj})+1$ it is desired that the following equation be satisfied.

Moreover, it is desired that the above method further include a step of accumulating a group of signals including a plurality of signals based on the electric current that is output from a photoreceptor every time light is emitted while the step of emitting light is performed N times, and a step of averaging a group of accumulated N signals.

When L denotes a maximum distance to the object detectable by the method of detecting an object, $\omega_{obj}$ denotes a pulse width of a signal that originates from the light reflected by the object, $\sigma_{sn}$ denotes a standard deviation of the shot noise, c denotes speed of light, and when $F(V_{th}, 0, \sigma_{sn})$ denotes a standard normal cumulative distribution function, $M \geq F(-V_{th}/N, 0, \sigma_{sn}) \times (2L/c) \times (1/\omega_{obj})+1$ it is desired that the following equation be satisfied.

Moreover, it is desired that the above method include a step of extracting the high-level signal that originates from the light reflected by an object from M high-level signals, based on the pulse widths of the M high-level signals obtained in the step of performing processes.

In the embodiments as described above, cases in which the rotating mirror 26 is provided with tow specular surfaces have been described. However, no limitation is intended thereby.

In the embodiments described above, a rotation mechanism that rotates the object detector 100 about the Z-axis may further be provided.

In the embodiments described above, the focal length $f_1$ of the coupling lens 22 may be equal to the focal length $f_2$ of the imaging optical system. In such cases, the coupling lens 22 and the imaging optical system may be used in common, and the cost can be reduced.

In the embodiments described above, the main controller 400 may perform some of the processes of the measurement controller 46, and the measurement controller 46 may perform some of the processes of the main controller 400.

In the embodiment as described above, cases in which the monitoring apparatus is provided with one object detector 100 have been described. However, no limitation is intended thereby. For example, the monitoring apparatus may include a plurality of object detector 100 according to the size of a vehicle or the monitoring area.

In the embodiment as described above, cases have been described in which the object detector 100 is used as a monitoring apparatus that monitors the view in the directions of travel of a vehicle. However, no limitation is intended thereby. For example, the object detector 100 may be provided for an apparatus that monitors the rear view or side view of the vehicle.

The object detector 100 according to the embodiments described above may be provided for any device or apparatus other than vehicles to serve as a sensing device. In such cases, the main controller 400 outputs alarm information that meets the purposes of the sensing.

The object detector 100 according to the embodiments described above may be used only for detecting the presence or absence of an object. In such a configuration, the time measuring device 45 or the object recognition unit 47 are not necessary, and it is not necessary for the measurement controller 46 to measure the distance to the object.

The object detector 100 according to the embodiments described above may be used only for detecting the distance to the object. In such a configuration, the object recognition unit 47 is unnecessary.

The object detector 100 according to the embodiments as described above may be applied to different purposes other than to a monitoring apparatus or a sensing device. For example, the object detector 100 may be applied to a rangefinder or a shape measuring apparatus.

In the object detector 100 according to the embodiments described above, a switch may be disposed between some of the components of the processing circuits of the first light detector 43 to block the flow of signals.

In the embodiments described above, a single laser diode (LD) is used as a light emitting element. However, no limitation is intended thereby. For example, an array of laser diodes where a plurality of laser diodes are one-dimensionally or two-dimensionally disposed, a vertical-cavity surface-emitting laser (VCSEL), a VCSEL array where a plurality of VCSELs are one-dimensionally or two-dimensionally disposed, other kinds of lasers, a light-emitting diode (LED), an LED array where a plurality of LEDs are one-dimensionally or two-dimensionally disposed, an organic electroluminescence (EL) element, an array of organic EL elements where a plurality of organic EL elements are one-dimensionality or two-dimensionally disposed may be used. For example, an array of stacked laser diodes where a plurality of laser diodes are stacked, and another type of array of laser diodes where a plurality of laser diodes are horizontally lined up may be used as the above array of laser diodes where a plurality of laser diodes are one-dimensionally disposed. For example, when the laser diode that serves as a semiconductor laser is replaced with a VCSEL, the number of light-emitting points within the array can be increased.

Note also that at least one of the signal amplifier and the high-pass filter (HPF) may be omitted in the processing circuit. In other words, the processing circuit may only include the current-voltage converter, or may include the current-voltage converter and the signal amplifier. Alternatively, the processing circuit may include a current-voltage converter and a high-pass filter.

The projection optical system may include no coupling lens. Alternatively, the projection optical system may include a different type of lens.

The projection optical system and the light receiving optical system may include no reflecting mirror. In other words, the light that is emitted from the laser diode may enter the rotating mirror without the optical path being folded, and the light that is reflected by an object and has entered a rotating mirror may enter a photodiode without the optical path being folded.

The image forming optical system of the light-receptive optical system may include any other optical element (for example, a condenser mirror) in place of or in addition to a lens.

Any other types of mirror such as a polygon mirror (rotating polygon mirror), a Galvano mirror, or a micro electro mechanical system (MEMS) mirror may be used as the deflective device in place of the rotating mirror.

The synchronous system may be provided with any other types of optical element such as a condenser mirror in place of the image forming lens.

In the embodiments as described above, a scanning LiDAR device is used as the object detector 100. However, in some embodiments, a non-scanning LiDAR device may be used instead. Alternatively, in place of the LiDAR device, a millimeter-wave radar that uses a radio or radar signal may be adopted. Such a millimeter-wave radar has an inferior resolving power compared with a LiDAR device. However, when a millimeter-wave radar is used, detection can be made regardless of the weather, and the measurable range is broader.

In the embodiments as described above, a car is taken as an example for the mobile object on which the object detector is mounted. However, no limitation is indicated thereby, and the mobile object may be an aircraft, ship, or a vehicle other than a car.

As is apparent from the above-description, the object detector 100, the monitoring apparatus 110, the sensing device 1000, and the mobile object, and the object detection method allow for the technology that obtains the information about the object, utilizing the time-of-flight (TOF) method or technology used for the TOF method. Such technology is widely used in the industries of the motion-capture technology, the distance-measuring equipment, and the three-dimensional shape measurement technology, in addition to the sensing in the mobile object. In other words, the object detector and the sensing device according to embodiments of the present disclosure may be mounted on a different object other than the mobile object.

In the following description, how the embodiments of the present disclosure as described above are conceived in the thinking process are described.

Currently, object detectors that detect the presence or absence of an object or the distance to the object are actively developed. For example, LiDAR devices are widely used for aircraft, railways, and vehicles. Various kinds of LiDAR devices are known in the art. For example, scanning LiDAR devices that detect the presence of the object within a desired range and the distance to the object are known in the art. Such LiDAR devices detect the presence of the object and the distance to the object by scanning a laser beam emitted from a light emitter and receiving by a photoreceptor the laser beam reflected or scattered by an object and reflected by a rotating mirror again.

When the distance is measured by such LiDAR devices as above, separation between the noise and the signals from an object is important. Among several kinds of noise, a shot noise is a white noise that emerges as a result of light-quantity measurement, and when the sensitivity of a photoreceptor is high or the disturbance light is strong, it becomes difficult to distinguish between the size of shot noise and signals from an object. In other words, shot noises tend to be more problematic than circuit noises.

FIG. 14 is a diagram illustrating a situation in which shot noises and signals from an object in a desired angle of view (light-emitting direction) are mixed.

Among these signals (including shot noises), the signals that exceed the threshold Vat are candidates for the signals to be processed by a computing unit (i.e., the signals to be used for distance computation). In FIG. 14, eight signals (M=8) become the candidates for the signals to be processed by a computing unit, and the fifth and eight signals are the signals from an object.

Figure 15:
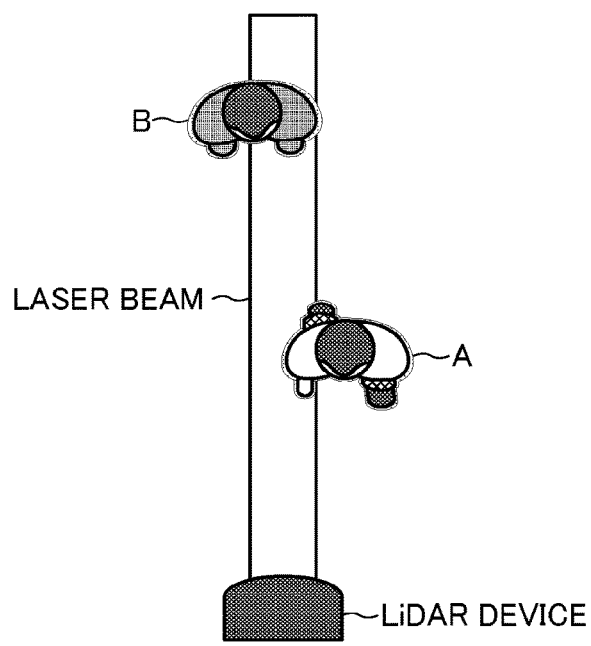
FIG. 15 is a second diagram used to explain the thinking process that led to the conception of an embodiment of the present disclosure.

For example, as illustrated in FIG. 15, such a situation occurs when two objects exist in the neighborhood (at different distances) with any desired angle of view of a LiDAR device, and an object A on the front side (at a short distance) is irradiated with some of the emitted laser beams and an object B on the rear side (at a long distance) is irradiated with the remaining laser beams.

The data to be used for distance computation is merely a combination of the time of rise $t_r$ and the time of fall $t_f$ where the signals run below $V_{th}$, and it is difficult to distinguish between the signals from an object and the shot noises based on the obtained combination data.

In view of the above circumstances, $V_{th}$ may be set high, and a method of reducing as much as possible a situation in which shot noises are processed by a computing unit is theoretically possible. However, such a method causes the following two problems. The first problem is in that the measurable maximum range decreases. As known in the art, as the distance between the LiDAR device and the object gets longer, the peak intensity of the reflected or scattered light decreases, and does not go beyond $V_{th}$. The second problem is in that because of the physical properties and characteristics of shot noise, however high $V_{th}$ may be set, there should exist a shot noise where the peak intensity exceeds $V_{th}$ in view of the probability. In view of the above circumstances, it is not desirable that $V_{th}$ be set too high, and it is desired that $V_{th}$ be set to an appropriate level. All the signals whose peak intensity exceeds $V_{th}$ are to be the candidates for the signals to be processed by a computing unit, and it is desired that these candidates be separated into signals from an object and shot noises.

When there are M signals whose peak intensity exceeds $V_{th}$ in total, the processing time of these M signals becomes M-times longer than the length of time τ it takes to process one signal. When M takes a greater value, the signals from an object can be caught with reliability. However, the processing time at a processing unit becomes longer, and the frame rate decreases. By contrast, when the value of M is to be reduced, the number of shot noises need to be reduced to a number sufficiently smaller than M. However, such a configuration will lead to a reduced measurable maximum range.

In view of the above circumstances, the value of M needs to be appropriately determined in view of the measurable maximum range and the value set to $V_{th}$. Alternatively, the value of $V_{th}$ needs to be appropriately determined in view of the measurable maximum range and the value of M.

In view of the above circumstances and findings, the embodiments of the present disclosure were conceived.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. An object detector comprising:
   a light source configured to emit light;
   a photoreceptor configured to receive the light reflected by an object; and
   a binarizing circuit configured to binarize a signal sent from the photoreceptor at a threshold $V_{th}$,
   wherein object detection processes are performed in a same direction until a high-level signal is output M times from the signal binarized by the binarizing circuit, wherein a value of the M is determined based on an incidence of shot noise where peak intensity exceeds the threshold $V_{th}$ in the photoreceptor.

2. The object detector according to claim 1, wherein when L denotes a maximum distance to the object detectable by the object detector 100, $\omega_{obj}$ denotes a pulse width of a signal of the light reflected by the object, $\sigma_{sn}$, denotes a standard deviation of the shot noise, c denotes speed of light, and when $F(V_{th}, 0, \sigma_{sn})$ denotes a standard normal cumulative distribution function, $$M \geq F(-V_{th}, 0, \sigma_{sn}) \times (2L/c) \times (1/\omega_{obj}) + 1$$

is satisfied.

3. The object detector according to claim 1, further comprising an averaging circuit configured to take an average of a group of N signals input when the light is emitted N times in the same direction, each of the N signals including a plurality of signals.

4. The object detector according to claim 3, wherein when L denotes a maximum distance to the object detectable by the object detector, $\omega_{obj}$ denotes a pulse width of a signal of the light reflected by the object, $\sigma_{sn}$ denotes a standard deviation of the shot noise, c denotes speed of light, and when $F(V_{th}, 0, \sigma_{sn})$ denotes a standard normal cumulative distribution function, $$M \geq F(-V_{th}/N, 0, \sigma_{sn}) \times (2L/c) \times (1/\omega_{obj}) + 1$$

is satisfied.

5. The object detector according to claim 1, wherein a high-level signal of the light reflected by the object is extracted from M high-level signals, based on pulse widths of the M high-level signals.

6. The object detector according to claim 1,
wherein a timing at which the photoreceptor receives the light is calculated and obtained, based on a high-level signal of the light reflected by the object,
wherein a distance to the object is calculated and obtained based on a timing at which the light is emitted by the light source and the timing at which the light is received by the photoreceptor.

7. The object detector according to claim 1,
wherein the light source emits the light in a plurality of directions,
wherein a shape of the object is estimated based on a distance to the object in the plurality of directions.

8. A sensing device comprising:
the object detector according to claim 1; and
a monitoring controller configured to obtain movement information of the object including at least one of presence or absence of movement of the object, a moving direction, and speed of the object, based on output from the object detector.

9. The sensing device according to claim 8,
wherein the sensing device is provided for a mobile object,
wherein the monitoring controller determines whether there is danger based on at least one of position information of the object and the movement information.

10. A mobile object apparatus comprising:
the sensing device according to claim 8, and
a mobile object provided with the sensing device.

11. An object detector comprising:
a light source configured to emit light;
a photoreceptor configured to receive the light reflected by an object; and
a binarizing circuit configured to binarize a signal sent from the photoreceptor at a threshold $V_{th}$,
wherein object detection processes are performed in a same direction until a high-level signal is output M times from the signal binarized by the binarizing circuit,
wherein the threshold $V_{th}$ is set based on a value of the M, and
wherein when L denotes a maximum distance to the object detectable by the object detector 100, $\omega_{obj}$ denotes a pulse width of a signal of the light reflected by the object, $\sigma_{sn}$ denotes a standard deviation of shot noise, c denotes speed of light, and when $F(W_{th}, 0, \sigma_{sn})$ denotes a standard normal cumulative distribution function, $$M \geq F(-V_{th}, 0, \sigma_{sn}) \times (2L/c) \times (1/\omega_{obj}) + 1$$

is satisfied.

12. The object detector according to claim 11, wherein a high-level signal of the light reflected by the object is extracted from M high-level signals, based on pulse widths of the M high-level signals.

13. The object detector according to claim 11,
wherein a timing at which the photoreceptor receives the light is calculated and obtained, based on a high-level signal of the light reflected by the object,
wherein a distance to the object is calculated and obtained based on a timing at which the light is emitted by the light source and the timing at which the light is received by the photoreceptor.

14. The object detector according to claim 11,
wherein the light source emits the light in a plurality of directions,
wherein a shape of the object is estimated based on a distance to the object in the plurality of directions.

15. A sensing device comprising:
the object detector according to claim 11; and
a monitoring controller configured to obtain movement information of an object including at least one of presence or absence of movement of the object, a moving direction, and speed of the object, based on output from the object detector.

16. The sensing device according to claim 15,
wherein the sensing device is provided for a mobile object,
wherein the monitoring controller determines whether there is danger based on at least one of position information of the object and the movement information.

17. A mobile apparatus comprising:
the sensing device according to claim 15, and
a mobile object provided with the sensing device.

18. An object detector comprising:
a light source configured to emit light;
a photoreceptor configured to receive the light reflected by an object; and
a binarizing circuit configured to binarize a signal sent from the photoreceptor at a threshold $V_{th}$,
wherein object detection processes are performed in a same direction until a high-level signal is output M times from the signal binarized by the binarizing circuit,
wherein the threshold $V_{th}$ is set based on a value of the M,
wherein the object detector further comprises an averaging circuit configured to take an average of a group of N signals input when the light is emitted N times in the same direction, each of the N signals including a plurality of signals, wherein when L denotes a maximum distance to the object detectable by the object detector, $\omega_{obj}$ denotes a pulse width of a signal of the light reflected by the object, $\sigma_{sn}$ denotes a standard deviation of shot noise, c denotes speed of light, and when $F(V_{th}, 0, \sigma_{sn})$ denotes a standard normal cumulative distribution function, $$M \geq F(-V_{th}/N, 0, \sigma_{sn}) \times (2L/c) \times (1/\omega_{obj}) + 1$$

is satisfied.

* * * * *